US009195429B2

(12) United States Patent
Morton et al.

(10) Patent No.: US 9,195,429 B2
(45) Date of Patent: Nov. 24, 2015

(54) MULTI-USER DISPLAY SYSTEM AND METHOD

(71) Applicant: Gazoo, Inc., Bryan, TX (US)

(72) Inventors: Joseph Scott Morton, College Station, TX (US); Christopher Michael McDonald, Bryan, TX (US); Glenn Donald Knepp, College Station, TX (US)

(*) Notice: Subject to any disclaimer, the term of this patent is extended or adjusted under 35 U.S.C. 154(b) by 0 days.

(21) Appl. No.: 14/642,718

(22) Filed: Mar. 9, 2015

(65) Prior Publication Data

US 2015/0254048 A1 Sep. 10, 2015

Related U.S. Application Data

(63) Continuation-in-part of application No. 14/642,639, filed on Mar. 9, 2015.

(60) Provisional application No. 61/950,289, filed on Mar. 10, 2014.

(51) Int. Cl.
*G06F 15/16* (2006.01)
*G06F 3/14* (2006.01)
(Continued)

(52) U.S. Cl.
CPC .............. *G06F 3/1454* (2013.01); *G09G 5/006* (2013.01); *G09G 5/363* (2013.01); *G09G 2360/04* (2013.01); *G09G 2370/022* (2013.01); *G09G 2370/16* (2013.01)

(58) Field of Classification Search
USPC .................. 709/203, 217–219, 223–229, 250
See application file for complete search history.

(56) References Cited

U.S. PATENT DOCUMENTS 7,730,205 B2 * 6/2010 Rothman et al. .............. 709/238
8,200,796 B1 6/2012 Margulis
(Continued)

FOREIGN PATENT DOCUMENTS

CN 1220346 C 9/2005

OTHER PUBLICATIONS

Armstrong, "Amazon AppStream—Let the Cloud Do the Heavy Lifting", i Programmer, Publication [online]. Nov. 14, 2013 [retrieved May 19, 2015], Retrieved from the internet:<URL: http://www.i-programmer.info/news/141-cloud-computing/6604-amazon-appstream.html>; pp. 1-3.

(Continued)

*Primary Examiner* — Zarni Maung
(74) *Attorney, Agent, or Firm* — Kevin M. Klughart; Carstens & Cahoon, LLP

(57) ABSTRACT

A system and method implementing a multi-user display linking multiple independent software processes with remote mobile devices is disclosed. The system/method augments multiple planes of conventional video graphics memory (VGM) controlled by a video graphics controller (VGC) in a host computing context (HCC) with a plane selection register (PSR) that enables isolation of individual planes of video memory within the VGM. The PSR is associated with a process mapping table (PMT) that maps in hardware a user process identification (PID) associated with an individual software process running within the HCC under control of a host operating system (HOS). HOS process context changes update the PSR with PMT content corresponding to an active HCC PID. A video graphics encoder (VGE) inspects areas of change within individual VGM planes and emits these changes as streaming video content to an Ethernet interface communicating with remote mobile devices associated with the HCC PIDs.

30 Claims, 24 Drawing Sheets

(51) Int. Cl.
  *G09G 5/00*  (2006.01)
  *G09G 5/36*  (2006.01)
  *G06F 12/00* (2006.01)

(56) References Cited

U.S. PATENT DOCUMENTS

| | | | |
|---|---|---|---|
| 8,656,261 B2 * | 2/2014 | Lee et al. | 714/784 |
| 2006/0013390 A1 | 1/2006 | Herz et al. | |
| 2008/0056671 A1 | 3/2008 | Kamijo et al. | |
| 2008/0263361 A1 | 10/2008 | Dutta et al. | |
| 2010/0313226 A1 | 12/2010 | Cholas et al. | |
| 2011/0093822 A1 | 4/2011 | Sherwani | |
| 2011/0208837 A1 | 8/2011 | Sartori | |
| 2011/0296179 A1 | 12/2011 | Templin et al. | |
| 2011/0314356 A1 | 12/2011 | Grube et al. | |
| 2012/0076197 A1 | 3/2012 | Byford et al. | |
| 2012/0149476 A1 | 6/2012 | Perlman et al. | |
| 2012/0254450 A1 | 10/2012 | Lejeune et al. | |
| 2013/0013828 A1 | 1/2013 | Pang et al. | |
| 2013/0239134 A1 | 9/2013 | Lajoie et al. | |
| 2013/0268775 A1 | 10/2013 | Hawkins | |
| 2013/0279877 A1 | 10/2013 | Boak | |
| 2013/0291006 A1 | 10/2013 | Tam | |
| 2013/0311768 A1 | 11/2013 | Fosmark et al. | |
| 2014/0052770 A1 | 2/2014 | Gran et al. | |
| 2014/0149829 A1 * | 5/2014 | Lee et al. | 714/776 |
| 2014/0219266 A1 * | 8/2014 | Song et al. | 370/345 |
| 2014/0245339 A1 | 8/2014 | Zhang et al. | |
| 2014/0372754 A1 | 12/2014 | Aissi et al. | |

OTHER PUBLICATIONS

The International Search Report and the Written Opinion of the International Searching Authority for International Application No. PCT/US2015/019742.

* cited by examiner

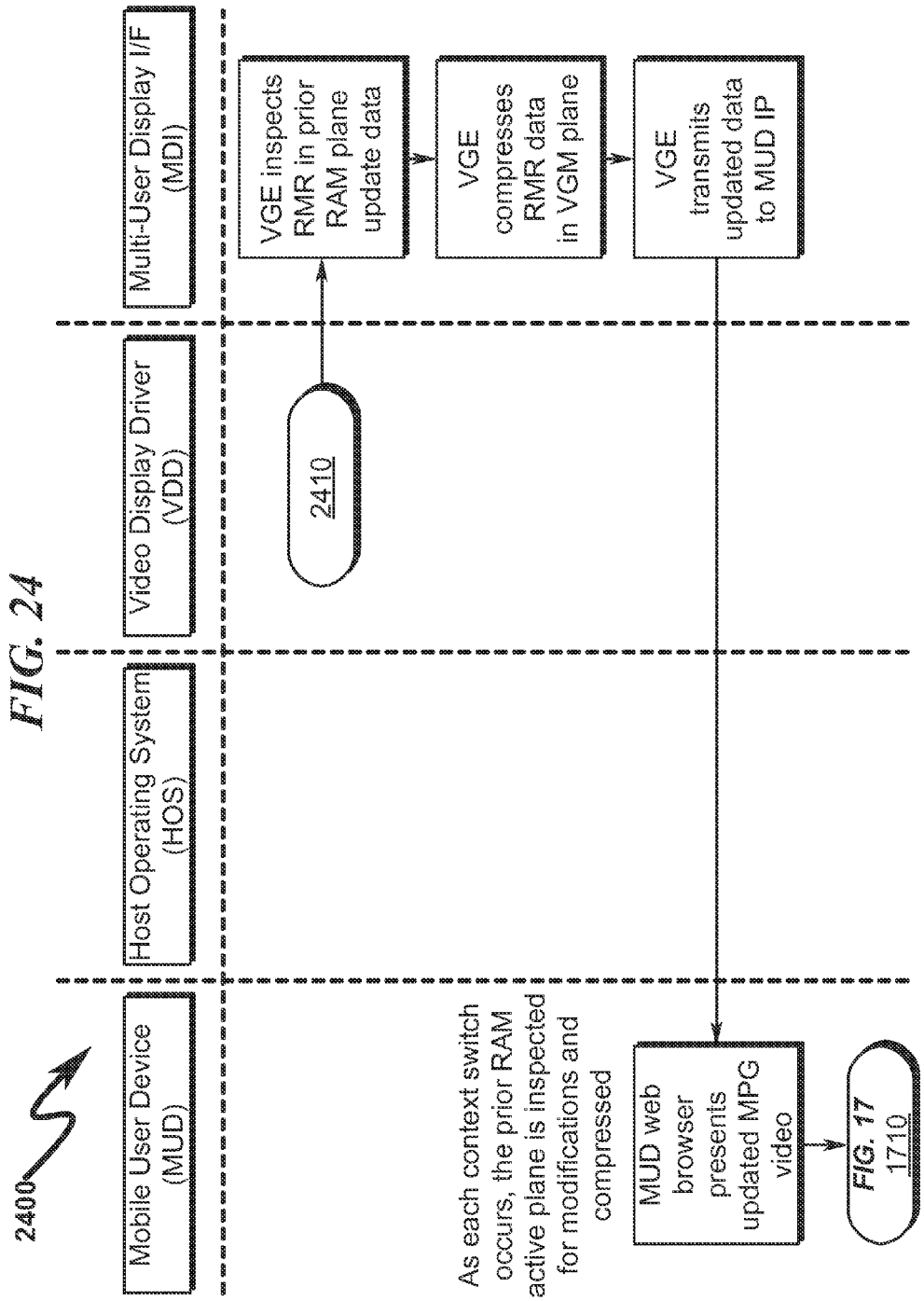

MULTI-USER DISPLAY SYSTEM AND METHOD

CROSS REFERENCE TO RELATED APPLICATIONS

U.S. Provisional Patent Applications

This application claims benefit under 35 U.S.C. §119 and incorporates by reference U.S. Provisional Patent Application for CLOUD COMPUTING SYSTEM AND METHOD by inventors Joseph Scott Morton, Christopher Michael McDonald, and Glenn Donald Knepp, filed electronically with the USPTO on Mar. 10, 2014, with Ser. No. 61/950,289, EFS ID 18414620, confirmation number 2283.

U.S. UTILITY PATENT APPLICATIONS

This application claims benefit under 35 U.S.C. §120 and incorporates by reference U.S. Utility Patent Application for CLOUD COMPUTING SYSTEM AND METHOD by inventors Joseph Scott Morton, Christopher Michael McDonald, and Glenn Donald Knepp, filed electronically with the USPTO on Mar. 10, 2015, with Ser. No. 14/642,639, EFS ID 21718675, confirmation number 1436.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to multi-user display systems and methods for deploying host computer system (HCS) software applications to a mobile user device (MUD). More specifically and without limitation the present invention permits a single video graphics controller (VGC) to support a number of independent users via the use of independently coordinated video graphics memory that is updated and streamed to the end users as separate compressed video streams (CVS).

PRIOR ART AND BACKGROUND OF THE INVENTION

Prior Art (0100)-(0200)

As generally depicted in FIG. 1 (0100), the deployment of multi-user cloud computing services typically involves allocation of an individual host computer system (HCS) (0111) with host operating system software (HOS) (0112) to an individual end-user (0119). This configuration typically includes the use of a video display device driver (VDD) (0113) that services a video graphics controller (VGC) (0114) having video graphics memory (VGM) (0115) that stores graphical information to be presented to the end-user (0119). This graphical data in the graphics memory (0115) is then transmitted serially to the video graphics display (VGD) (0116) for presentation to the end-user (0119). A variety of host application software (HAS) (0117) may be operable in this context on the HCS (0111) under control of the HOS (0112) and the VDD (0113) to display information via the VGC (0114) on the video graphics display (0116) for use by the end-user (0119).

Some networked variations of this configuration exist where the computer system (0111) communicates through a computer communication network (CCN) (0121) (such as the Internet) to form a virtual private network (VPN) (0122) to which a mobile device (0126) communicates and displays information to a mobile end-user (0129). Within this context each end-user (0119, 0129) has the opportunity to run a variety of host application software (HAS) (0117, 0217) executed on the HCS (0111).

As generally depicted in FIG. 2 (0200), deployment of this architecture on a scaled basis involves construction of a host computer system blade rack (0210) comprising a number of HCS CPU blades (0211, 0219) each of which communicates via an Ethernet interface (0221, 0229) to an Ethernet switch (0230) to a computer network (0240) and the end-user mobile device (MUD) (0251, 0259). Application software on the MUD (0251, 0259) communicates via a VPN network back to the individual HCS CPU blade (0211, 0219) allocated for that individual MUD (0251, 0259). Mapping of each individual HCS CPU blade (0211, 0219) to the end-user mobile device (MUD) (0251, 0259) is accomplished via a resource allocator (0201) computer system dedicated to processing service requests from the individual end-user mobile devices (MUD) (0251, 0259).

The deployment of HAS (0117, 0217) to a large number of end-users using this traditional methodology can be problematic for several reasons including:

- A HCS CPU blade (0211, 0219) is required to support each individual MUD (0251, 0259). This is a very expensive proposition given that the individual MUD (0251, 0259) may be a low value hardware component.
- The MUD may have insufficient resources to efficiently operate a VPN to support communication to the HCS CPU blade (0211, 0219).
- Idle processing capacity of unused HCS CPU blades (0211, 0219) is essentially wasted as there is no possibility of timesharing support among various individual MUD (0251, 0259) end-users.
- The MUD (0251, 0259) may have insufficient processing power to run the HAS directly.
- The MUD (0251, 0259) may have insufficient communication bandwidth to provide responsive access to the HAS (0117, 0217).
- The MUD (0251, 0259) may not have input hardware compatible with the HCS (0111) operating environment (missing keyboard, mouse, or other user input device).
- The MUD (0251, 0259) may not have display hardware compatible with the HCS (0111) operating environment (missing keyboard, mouse, or other user input device).

All of these issues may result in a poor user experience with the HCS/HAS combination and in many circumstances prevent the HAS from being capable of deployment in a MUD environment.

The typical approaches to HAS deployment to remote computing devices includes the use of a web browser interface on the HCS as an access portal to the HAS or the use of a virtual private network (VPN) that links the MUD to the HCS over a secure network interface. Both of these approaches suffer from significant performance limitations in that they require a large communication bandwidth overhead between the HCS and MUD to maintain a real-time view of the display screen that is simulated by the HCS for the purposes of providing a virtualized display for the HAS. MUDs having limited processing power or limited communication bandwidth to the HCS suffer in these circumstances because these limitations result in poor application responsiveness and a resulting poor user experience.

Additionally, the large communication overhead associated with VPN methodologies (especially in situations where the video display experiences a high rate of change or user input such as keyboard or mouse input is common) results in higher communication costs for MUDs using this form of interface. High frame rate updates by a typical VPN remote console simulator often result in very high communication link bandwidth utilization between the HCS and MUD and cannot be supported in situations where the communication link bandwidth is limited. All of these drawbacks may be cost/performance prohibitive in situations where the end user has limited financial and hardware means.

Conventional RDP Implementations

As an example of a conventional prior art remote terminal services emulator, MICROSOFT® Corporation has implemented Remote Desktop Protocol (RDP). RDP is based on, and an extension of, the ITU T.120 family of protocols. RDP is a multiple-channel capable protocol that allows for separate virtual channels for carrying device communication and presentation data from the server, as well as encrypted client mouse and keyboard data. RDP provides an extensible base and supports up to 64,000 separate channels for data transmission and provisions for multipoint transmission.

On the server, RDP uses its own video driver to render display output by constructing the rendering information into network packets by using RDP protocol and sending them over the network to the client. On the client, RDP receives rendering data and interprets the packets into corresponding Microsoft Windows graphics device interface (GDI) API calls. For the input path, client mouse and keyboard events are redirected from the client to the server. On the server, RDP uses its own keyboard and mouse driver to receive keyboard and mouse events.

RDP implements a multichannel capable protocol allowing for separate virtual channels for carrying presentation data, serial device communication, licensing information, highly encrypted data (keyboard, mouse activity), and so on. As RDP is an extension of the core T.Share protocol, several other capabilities are retained as part of the RDP, such as the architectural features necessary to support multipoint (multi-party sessions). Multipoint data delivery allows data from an application to be delivered in "real-time" to multiple parties without having to send the same data to each session individually (for example, Virtual Whiteboards).

The activity involved in sending and receiving data through the RDP stack is essentially the same as the seven-layer OSI model standards for common LAN networking today. Data from an application or service to be transmitted is passed down through the protocol stacks, sectioned, directed to a channel (through MCS), encrypted, wrapped, framed, packaged onto the network protocol, and finally addressed and sent over the wire to the client. The returned data works the same way only in reverse, with the packet being stripped of its address, then unwrapped, decrypted, and so on until the data is presented to the application for use. Key portions of the protocol stack modifications occur between the fourth and seventh layers, where the data is encrypted, wrapped and framed, directed to a channel and prioritized.

Each Terminal Server protocol (currently, only RDP and Citrix's ICA are supported) will have a protocol stack instance loaded (a listener stack awaiting a connection request). The Terminal Server device driver coordinates and manages the RDP protocol activity and is made up of smaller components, an RDP driver (Wdtshare.sys) for UI transfer, compression, encryption, framing, and so on, and a transport driver (Tdtcp.sys) to package the protocol onto the underlying network protocol, TCP/IP.

As can be seen from the above discussion, RDP simulates the video graphics memory (VGM) within the video device driver (VDD) to render display output into packets that are then reinterpreted by the remote terminal application. This in essence creates a "simulated" video display in software that encodes video rendering information, transmits it to a remote host, and recreates the rendering commands within the context of the remote terminal display. This terminal simulation results in significant computational overhead both on the host computer system as well as the remote mobile device, as each is responsible for a software translation of graphics rendered information. The resulting user experience can be unacceptable, especially in situations where the intervening computer communication network has low bandwidth or is susceptible to high transmission error probabilities.

Deficiencies in the Prior Art

The prior art as detailed above suffers from the following deficiencies:
  Prior art multi-user display systems and methods typically require a minimum CCN bandwidth to virtualize the HCS environment on the mobile device.
  Prior art multi-user display systems and methods typically lack responsiveness in situations where the CCN bandwidth is limited.
  Prior art multi-user display systems and methods typically consume considerable CCN bandwidth in virtualizing the HCS environment to the mobile device.
  Prior art multi-user display systems and methods typically lack responsiveness in situations where the MUD processing power is limited.
  Prior art multi-user display systems and methods typically require significant software application development to occur on the MUD to support the virtualized HCS environment.
  Prior art multi-user display systems and methods typically have difficulty in maintaining security for virtualized HCS environments supported by MUD hardware.
  Prior art multi-user display systems and methods require the use of a virtual private network (VPN) to maintain security between the HCS and MUD.
  Prior art multi-user display systems and methods typically have difficulty in porting the visual content of the HCS application to the MUD display environment.

While some of the prior art may teach some solutions to several of these problems, the core deficiencies in the prior art systems have not been addressed.

OBJECTIVES OF THE INVENTION

Accordingly, the objectives of the present invention are (among others) to circumvent the deficiencies in the prior art and affect the following objectives:

(1) Provide for a multi-user display system and method that requires a reduced minimum CCN bandwidth to virtualize the HCS environment on the mobile device.
(2) Provide for a multi-user display system and method that provides user responsiveness in situations where the CCN bandwidth is limited.
(3) Provide for a multi-user display system and method that consumes minimal CCN bandwidth in virtualizing the HCS environment to the mobile device.
(4) Provide for a multi-user display system and method that is responsive in situations where the MUD processing power is limited.
(5) Provide for a multi-user display system and method that requires minimum software application development to occur on the MUD to support the virtualized HCS environment.
(6) Provide for a multi-user display system and method that maintains security for virtualized HCS environments supported by MUD hardware.
(7) Provide for a multi-user display system and method that does not require the use of a virtual private network (VPN) to maintain security between the HCS and MUD.
(8) Provide for a multi-user display system and method that seamlessly ports the visual content of the HCS application to the MUD display environment.
(9) Provide for a multi-user display system and method that permits hardware acceleration of graphics rendering to the MUD.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention supports the deployment of multi-user display host software applications (HAS) and content to a plurality of mobile computing devices (MCD) from a host computer system (HCS) over a computer communication network (CCN). In an exemplary invention system embodiment the HCS is configured with conventional host operating system software (HOS) that supports execution of the HAS. This HOS is equipped with a video graphics controller (VGC) having multiple planes of video graphics display memory (VGM). Each video memory graphics plane (VGP) may be associated with a separate user application context running under control of the HOS. A plane selection register (PSR) is used to select which VGP is active and configured to receive data from a video graphics controller (VGC) configured within the HCS and controlled by a video device driver (VDD) operating under control of the HOS. A process ID (PID) context associative memory (CAM) may be used to support context switches between users and provide the functionality of the PSR.

Within this context a plurality of virtual user machines (VUM) can be supported in which a given user application program (UAP) may operate independently of other processes running on the HOS. As a given UAP is provided time-shared access to HCS resources, graphics commands sent to the VDD during this time slice are associated with a UAP process ID (PID). This PID is associated with a specific plane within the VGM by a plane mapping table (PMT) CAM memory that activates a specific plane within the VGM when the PID is written to the CAM address.

As individual VGP are updated by the VGC, and as user context is switched to another VGP by the VDD via the PID CAM (PSR), a video graphics encoder (VGE) inspects a VGP and encodes changes in the VGP content into a data content that is streamed to the remote MUD via Ethernet TCP/IP transport packets through a computer communication network (CCN) such as the Internet. This MPEG encoded content is then decoded on the remote MUD and presented for display to the remote user.

By utilizing streamed MPEG video rather than transmitting display images frame-by-frame from the HCS to the MUD, the bandwidth requirements for hosting the HAS on the MUD are drastically reduced, as the HCS can implement the HAS locally and merely provide a thin-client audio/video/keyboard/mouse interface to the MUD via translation services performed local to the MUD.

BRIEF DESCRIPTION OF THE DRAWINGS

For a fuller understanding of the advantages provided by the invention, reference should be made to the following detailed description together with the accompanying drawings wherein:

FIG. 17-24 illustrate an exemplary data flow and activity chart associated with operation of the present invention.

DESCRIPTION OF THE PRESENTLY PREFERRED EXEMPLARY EMBODIMENTS

Figure 1:
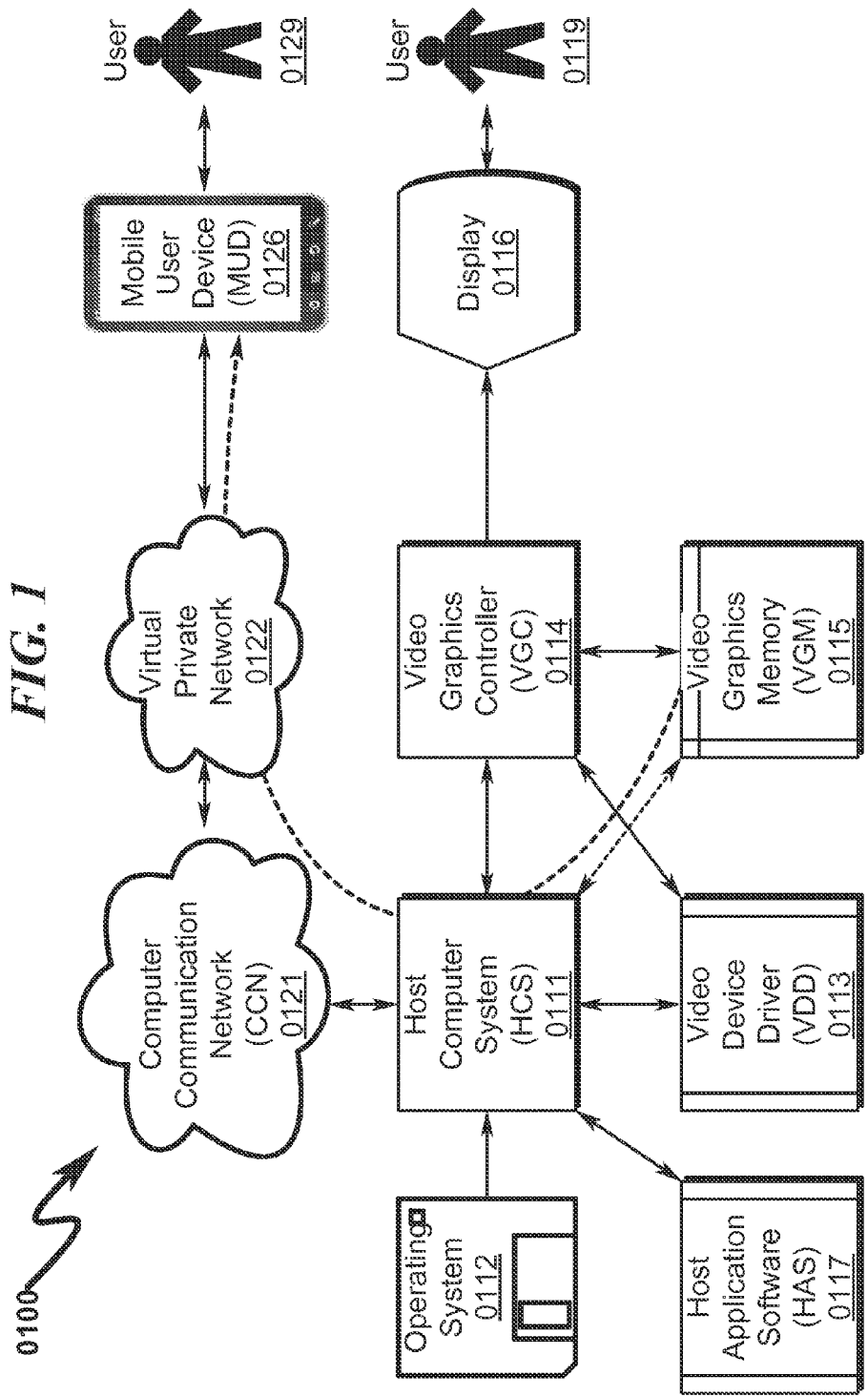
FIG. 1 illustrates a system block diagram of a prior art distributed computing environment involving a host computer system and mobile user device.
Figure 2:
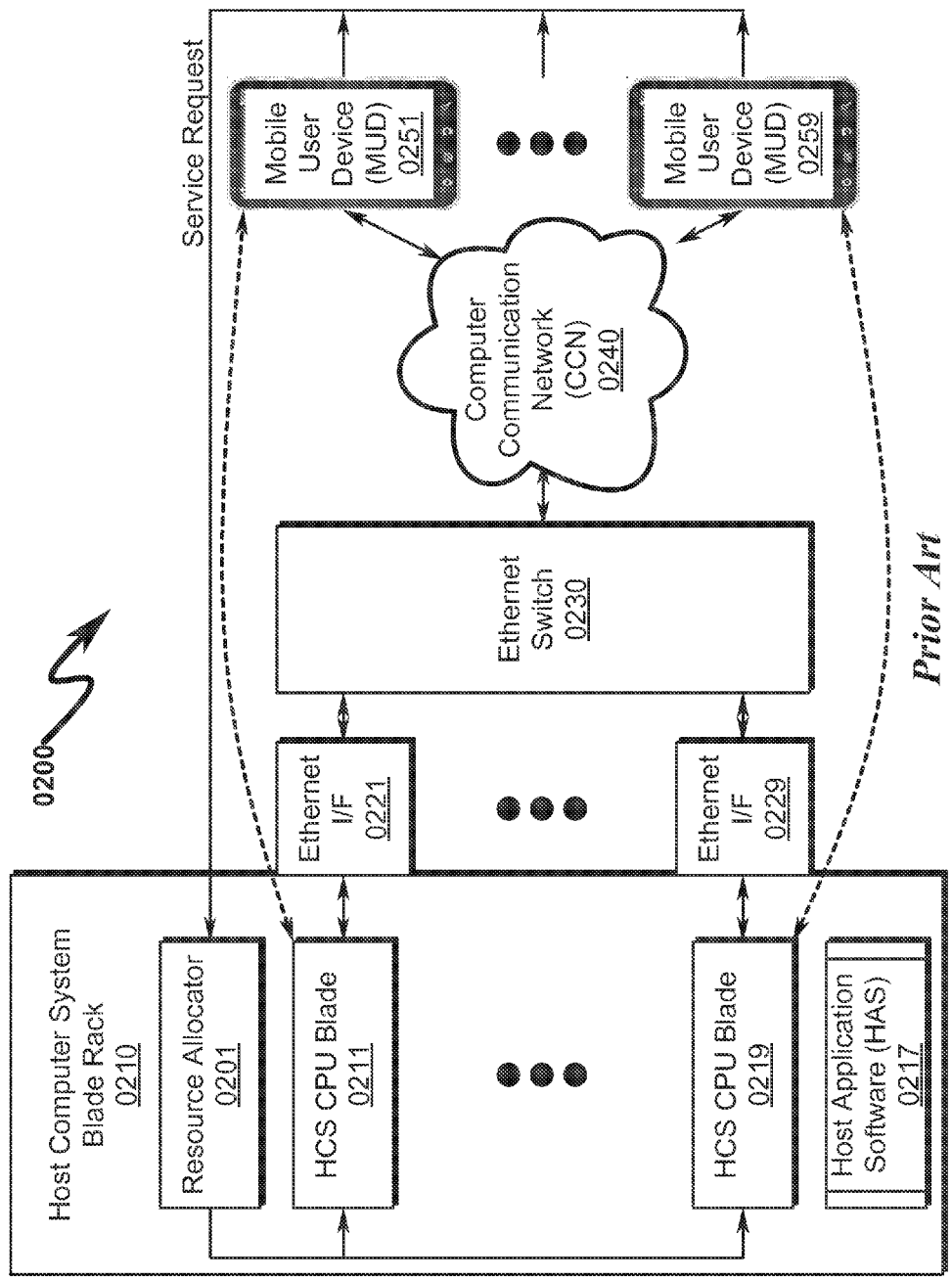
FIG. 2 illustrates a system block diagram of a prior art scaled distributed computing environment involving multiple host computer systems and multiple mobile user devices.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a MULTI-USER DISPLAY SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Remote Video Stream Not Limitive

The present invention anticipates that a wide variety of remote video streaming formats may be used to implement the video streaming component of the present invention. Without limitation, the RVS may include audio and/or video formats including but not limited to: MPEG; MPEG-2; MPEG-4; H.264; THEORA; WEBM; DIRAC; REALVIDEO; VP8; and HEVC.

Host Computer System HOS Not Limitive

The present invention anticipates that a wide variety of host computer system and host operating system software (HOS) may be used to implement the present invention. Without limitation, the HOS may include MICROSOFT® WINDOWS®; MAC®; and LINUX® operating system products.

Video Graphics Encoder (VGE) not Limitive

While MPEG compression will be used as the exemplary video graphics encoder (VGE) video compression methodology in the following discussion, the present invention is not limited to this particular form of video data compression. Thus, the term "video graphics encoder (VGE)" may refer to any number of video compression techniques and specifically includes those selected from the group consisting of: MPEG; MPEG-2; MPEG-4; H.264; THEORA; WEBM; DIRAC; REALVIDEO; VP8; and HEVC.

General Concept

The present invention has as a general object to use cloud technologies to deliver the latest software solutions to any internet enabled devices. The disclosed invention provides a complete desktop experience to mobile computing/mobile user devices (MCDs/MUDs) such as inexpensive pen and touch devices. Various invention embodiments, for example, would permit any WINDOWS®, MAC®, or LINUX® software application running on a remote host computer to effectively operate on a USD$50 ANDROID® tablet.

The present invention operates to lower the effective cost of deploying multi-user display solutions. The present invention leverages multi-user display to put the power of an expensive laptop into the hands of individuals unable to afford the tools necessary to support traditional multi-user display resources. The present invention allows for an individual in any underdeveloped nation with a cellphone Internet connection and inexpensive tablet computer to have the same software tools available to any person in a developed nation.

This objective is achieved by changing the way in which software is deployed to mobile devices. Rather than executing host software applications (HASs) on the mobile computing device (MCD), these applications are executed on cloud host computer systems (HCS). The presentation displays for HAS operating on the HCS are then streamed as MPEG video to the MCD. This allows the HCS to perform the heavy processing associated with the HAS and simultaneously minimize the communication bandwidth necessary to support a virtualized display to the MCD/MUD. User input from the MCD/MUD is translated into native HCS user input protocols and transparently entered into the HAS.

This approach to distributing HASs on MCDs has several advantages, including:

- Remote users need only support inexpensive MCD hardware to have access to powerful HASs resident on the HCS.
- HAS software can be automatically updated in a central HCS rather than require deployment to a plethora of remote MCDs.
- HAS software licensing can be leveraged to only support the maximum number of ACTIVE MCDs rather than licenses to all EXISTING MCDs.
- Software licensing fees associated with virtual operating systems and virtualized desktops are eliminated.
- The remote MCD need not have extensive hardware capability, just the capability of displaying video. All processing, memory, and storage requirements are provided by the HCS.
- The user experience on the MCD directly maps that which would be experienced on a local HCS.
- The processing and communications overhead associated with virtual desktops is eliminated (no 30 Hz/60 Hz refresh overhead associated with many virtualized desktops).
- User files are stored on the HCS and are not lost if the MCD is damaged, lost, or stolen.

One skilled in the art will recognize that this list is only exemplary and non-exhaustive.

System Overview (0300)

Figure 3:
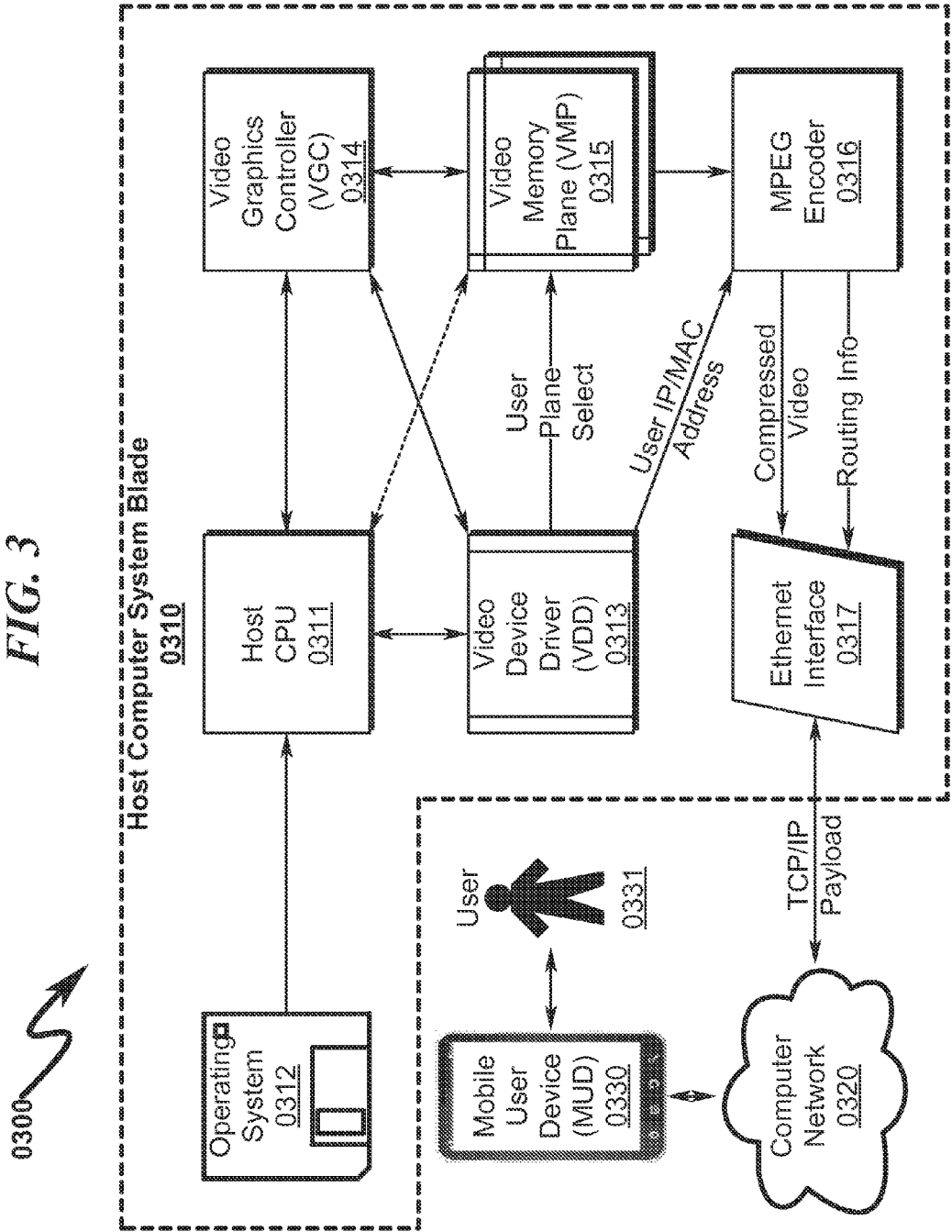
FIG. 3 illustrates an overview system block diagram of the present invention as implemented in a distributed computing environment involving a host computer system and a mobile user device.

An overview of the present invention system is generally depicted in FIG. 3 (0300) wherein a typical host computer system blade processor (0310) supporting a number of end-users (0331) is illustrated. Here the host computer system CPU (0311) is controlled by operating system software read from a computer readable medium (0312) that implements a video display device driver (VDD) (0313) servicing a video graphics controller (VGC) (0314). Associated with the VGC (0314) are a number of video graphics memory planes (VMP)

(0315) that are allocated to individual mobile user devices (MUD) (0330) and their associated end-users (0331) by the HCS (0311), HOS (0312), and VDD (0313).

The operating system (0312) is configured to support multiple virtual machines (MVM) within the CPU (0311) by allocating CPU hardware resources among various end-users (0331). This would be consistent with a timeshared multi-user environment known to those skilled in the art. However, this multi-user context is augmented with provisions within the VDD (0313) to select a particular VMP (0315) associated with a particular end-user context prior to sending commands to the VGC (0314). In this manner, the commands sent to the VGC (0314) will be executed by the VGC (0314) against a particular memory plane in the VMP (0315) array. This architecture allows utilization of a single CPU HCS (0311) and single VGC (0314) to service a number of MUD devices (0330) associated with their end-users (0331).

The present invention differs from traditional graphics remote user systems incorporating graphics in that the VMP (0315) data is not serially streamed to the remote MUD (0330) using traditional VPN technologies, but is rather inspected by a video graphics encoder (VGE) (0316) and then streamed in compressed format via an Ethernet interface (0317) to a computer communication network (CCN) to the MUD (0330) for display to the end-user (0331). Here the transmission overhead of large displays with high resolution is drastically minimized by the use of MPEG compression (0316) thus minimizing the necessary bandwidth in the CCN (0320) to support the display of information on the MUD (0330). Each VMP (0315) is associated with an IP and/or MAC address associated with the MUD (0330) and thus the video graphics encoder (VGE) (0316) may associate this transport information with the encoded data to the Ethernet interface (0317) for routing to the appropriate MUD (0330).

System Detail (0400)

Figure 4:
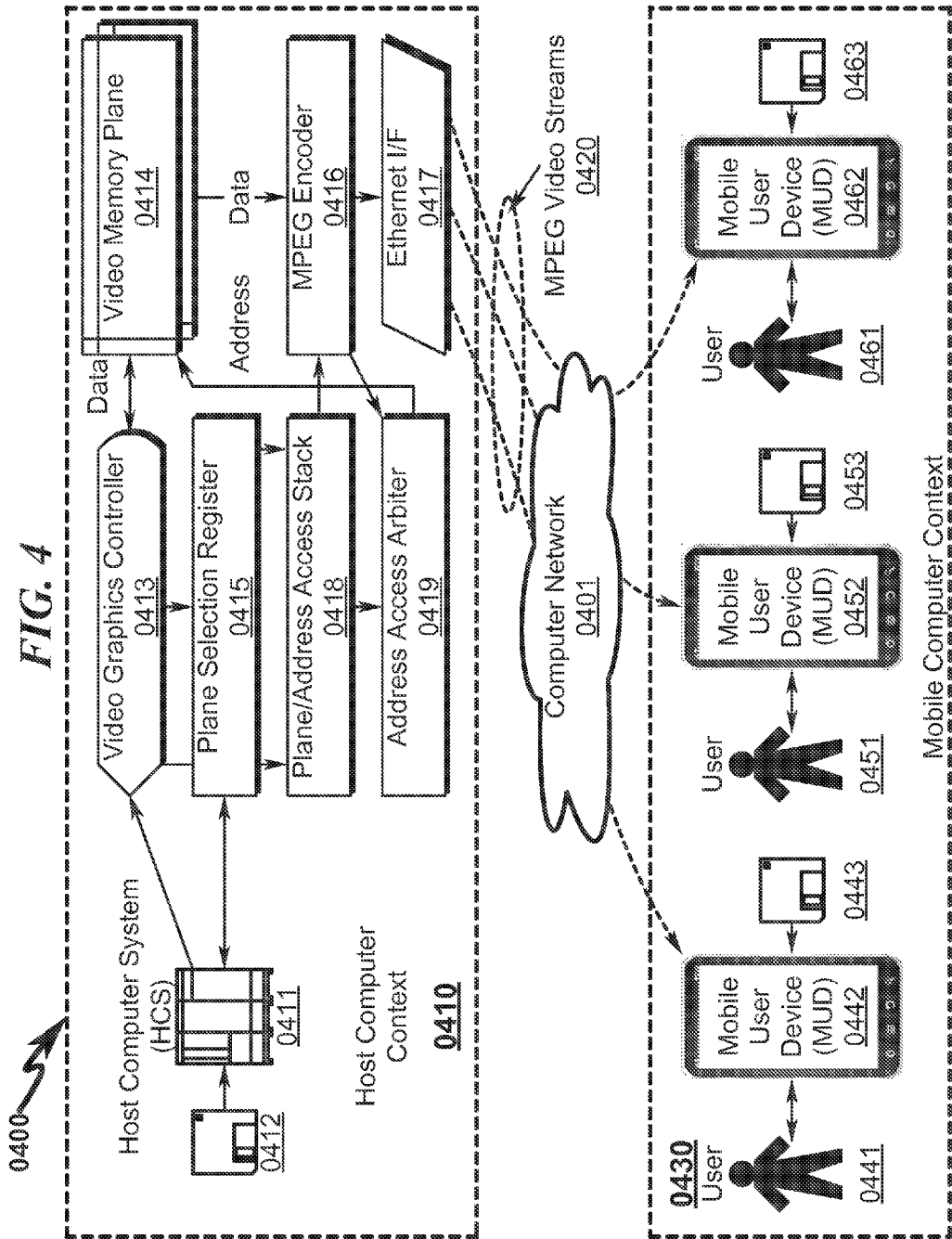
FIG. 4 illustrates a detail system block diagram of the present invention as implemented in a distributed computing environment involving a host computer system and multiple mobile user devices.

Additional detail of a preferred exemplary system embodiment is depicted in FIG. 4 (0400) wherein the host computer context (0410) supports multiple simultaneous MPEG video streams (0420) to a group of users in a mobile computer context (MCC) (0430) through a computer communication network (CCN) (0401). This MCC (0430) may include a plurality of users (0441, 0451, 0461) each having a mobile user device (0442, 0452, 0462) with associated machine instructions read from a computer readable medium (0443, 0453, 0463).

Within this context the VGC (0413) interacts with a VMP (0414) as selected by the PSR (0415). The PSR is configured to select an individual memory plane within the VMP (0414) based on the user process context at the time the VGC (0413) is activated. The video graphics encoder (VGE) (0416) is configured to read a particular plane in the VMP (0414) and encodes this into a compressed video stream and transport this via an Ethernet interface (0417) to a selected MUD (0442, 0452, 0462) in the mobile user context (0430). In conjunction with writes to the PSR (0415), a plane/address access stack (0418) may keep track of accesses to the VMP (0414) to allow the VGE (0416) to selectively process individual planes within the VMP (0414) for transmission to the appropriate end-user (0441, 0451, 0461). An address access arbiter (0419) may be used to coordinate access to the VMP (0414) among the VGC (0413) and the VGE (0416).

HCS/VGC/VGE Bus Architecture (0500)

Figure 5:
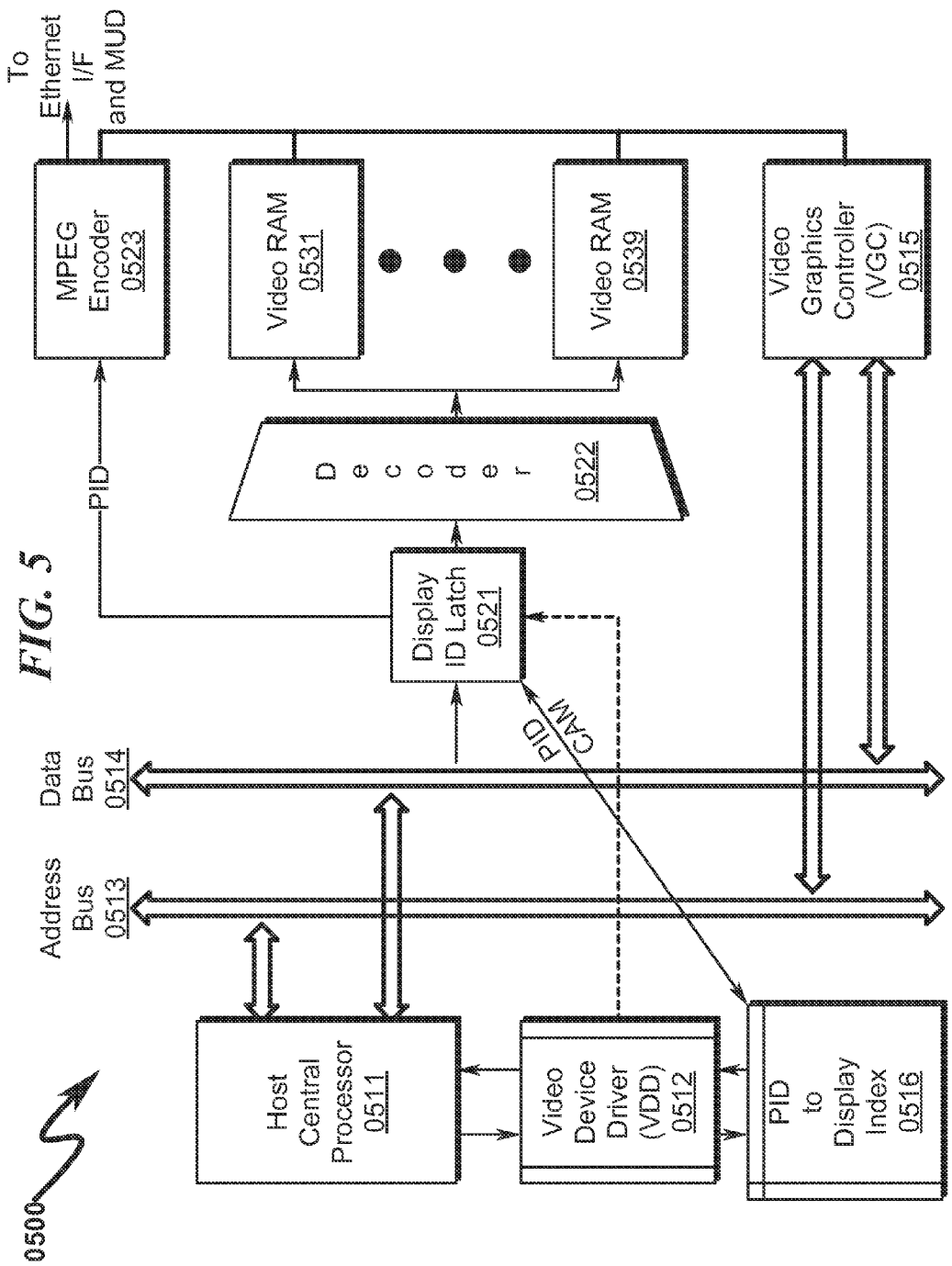
FIG. 5 illustrates a detail system block diagram of the present invention depicting the relationship between video RAM memory, the video graphics controller, and the PID display latch.

As generally depicted in FIG. 5 (0500), interconnects between the HCS (0511), VGC (0515), and VGE (0523) may take the form of various address (0513) and data (0514) busses. In this preferred exemplary embodiment, the HCS (0511) in conjunction with the VDD (0512) control the VGC (0515) but also serve to load the display ID latch (0521) with information from a PID to display index table (0516). The process ID (PID) of a given user application context (virtual machine) is loaded into the latch information into a register (0521) used to decode (0522) an individual video RAM plane (0531, 0539) to which the VGC (0515) writes rendered graphics display information. The VGE (0523) then compresses individual video RAM planes (0531, 0539) and transmits the encoded information via Ethernet hardware to individual mobile user devices.

PID CAM Architecture (0600)

Figure 6:
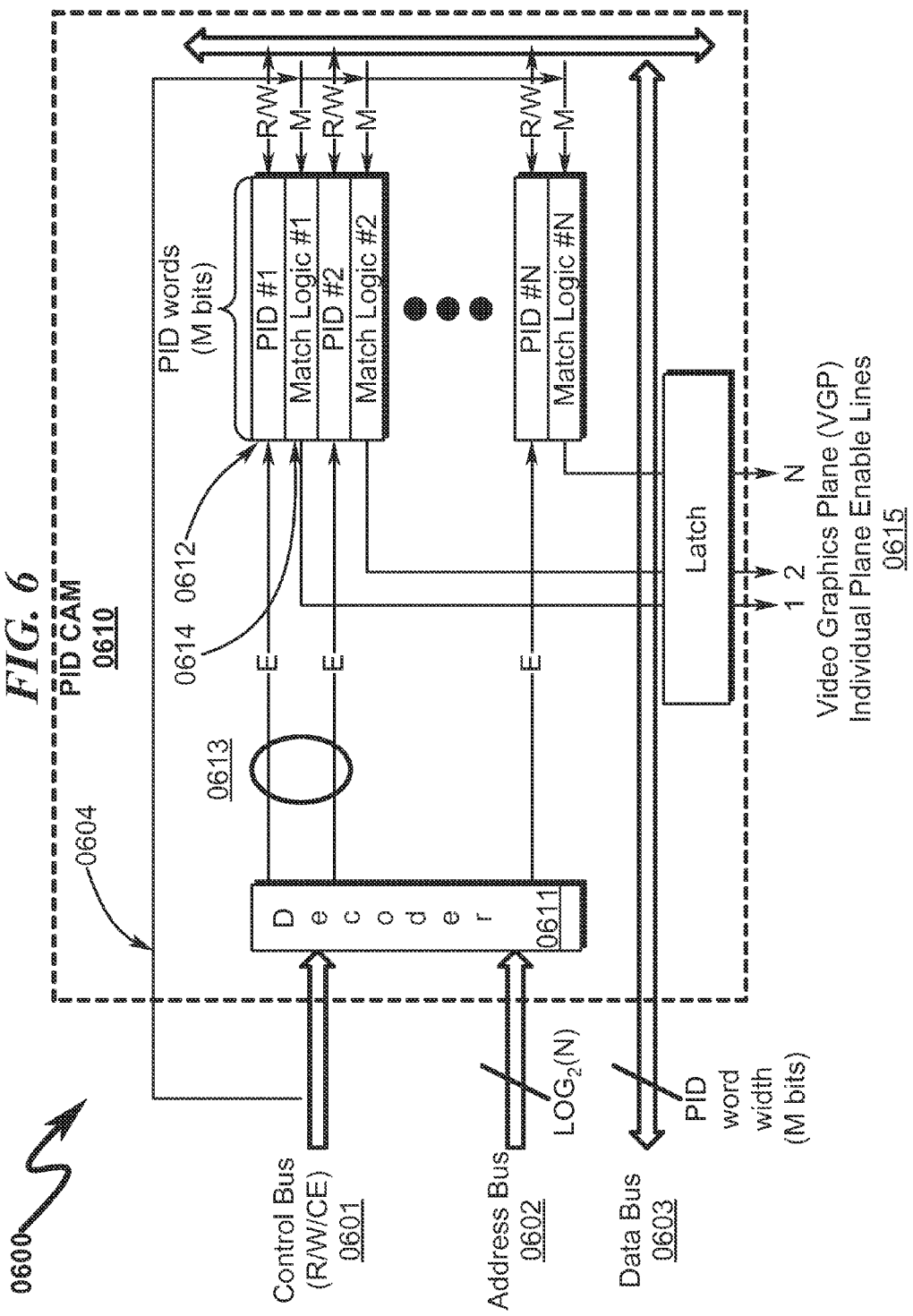
FIG. 6 illustrates a detail system block diagram of the present invention depicting a PID CAM implementation.

The present invention in many preferred embodiments may utilize a special purpose customized process ID (PID) context associative memory (CAM) to enable the selected VMP plane in the VGM. FIG. 6 (0600) provides an overview of the PID CAM architecture in this context. The PID CAM (0610) operates in part as a conventional RAM memory having a CONTROL BUS (READ/WRITE/CHIP ENABLE) (0601), ADDRESS BUS (0602), and DATA BUS (0603). The ADDRESS BUS is configured to address N PID words in the RAM and thus has log 2 (N) address lines. The DATA BUS (0603) is configured in M bits as wide as the datum containing the PROCESS IDENTIFICATION of the user processes as defined by the HOS. Typically this will be M=1, 2, 4, or 8 bytes in width.

The RAM portion of the PID CAM is decoded by a decoder (0611) that selects PID WORDS (0612) of M bits in width in an array that is N words in size. ENABLE signals (0613) from the decoder (0611) select individual PID words (0612) for READ (R) or WRITE (W) access via the DATA bus (0603). This allows the PID CAM (0610) to be loaded by the HOS with the PID of every user application context requiring a graphics display VGP display plane from the VGC. The HOS in conjunction with the VDD is responsible for loading the PID CAM RAM cells (0612) with the appropriate PID values associated with the user video contexts simultaneously supported by the HOS.

Once the PID RAM cell (0612) is loaded with a vector of PID values, the VDD operates as follows. Upon any application programming interface (API) request from the HOS to render graphics data on the VGC, the VDD will first determine the PID of the currently active user process and write this PID via the DATA BUS (0603) to the PID CAM using the MATCH function (0604). This triggers match logic (0614) associated with each PID RAM cell (0612) to attempt a match between the value on the DATA BUS (0603) and that contained in any of the associated PID RAM cell (0612). The results of this equality match are a number of individual video graphics plane (VGP) enable lines (0615) that are used to enable a plane in the VGM. This plane enable signal is latched and remains active until the next MATCH (0604) is received by the PID CAM (0610). After the MATCH (0604) function is completed by writing the user PID to the PID CAM and a particular plane of the VGM has been enabled, the VDD communicates with the VGC to render graphics information to the selected and active VGP.

The PID CAM is a very fast device in this context and permits instantaneous switching from one user video context to another by directly generating enable lines that are used to enable/disable planes of video memory to which the VGC will subsequently write rendered graphics information. Note also in this context that the VGC need not have any contextual information regarding the fact that video rendering commands from the VDD are being realized in more than one VGP plane in the VGM. This allows highly integrated and robust VGC controllers to be used in this context without any hardware adjustments to their memory interface or control logic.

The HOS and VDD are required to cooperate and ensure that the PID information contained in the PID CAM (0610) reflects the current PID values present in the HOS. For this reason, the PID CAM in many application contexts is reset to all ZEROS on VDD initialization and individual RAM cells are cleared to ZERO to indicate scenarios in which the PID for the user context has been terminated and the user virtual machine deleted from the HOS.

Method Overview (0700)-(0800)

Figure 7:
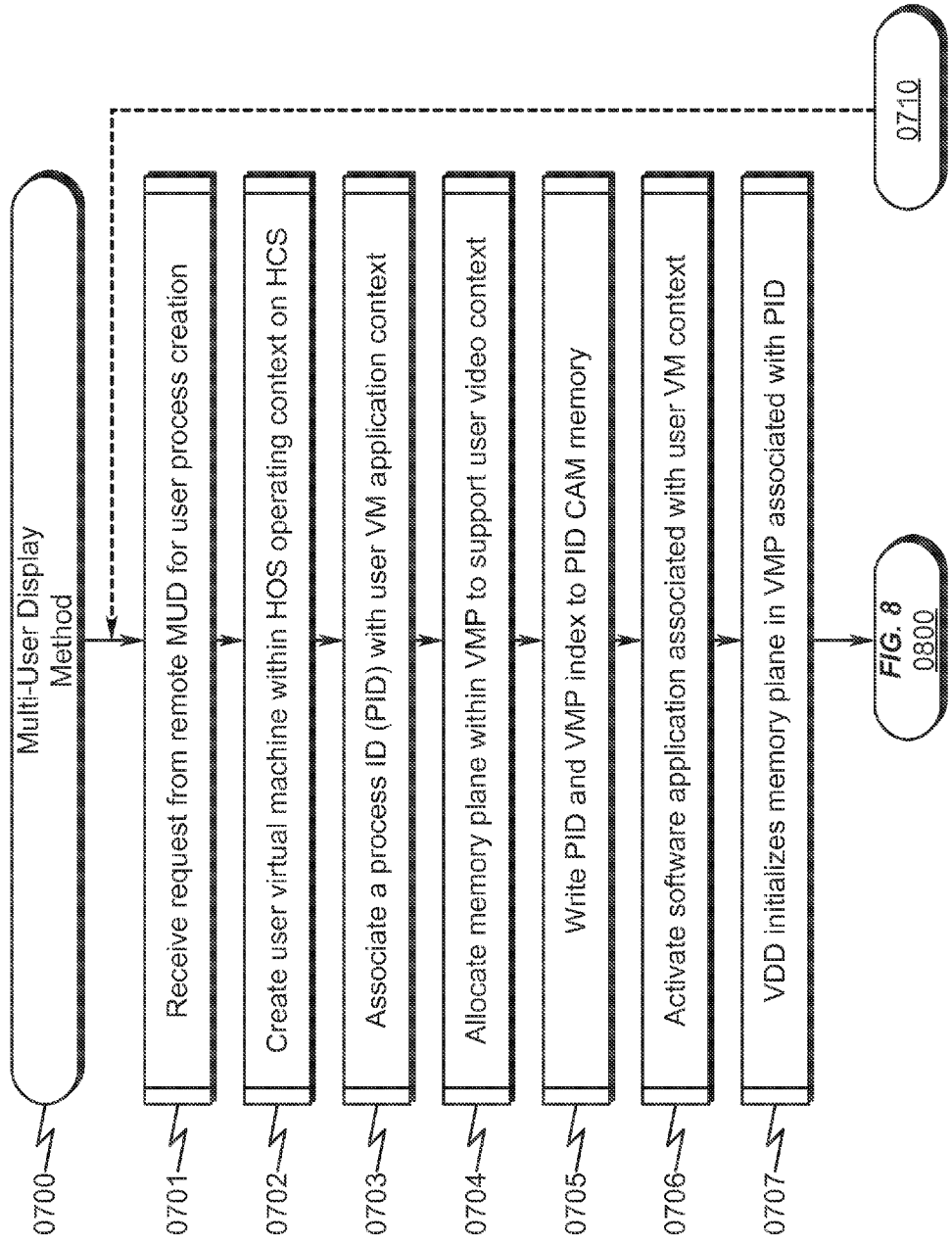
FIG. 7 illustrates a flowchart depicting a preferred exemplary embodiment of the present invention method (page 1 of 2)
Figure 8:
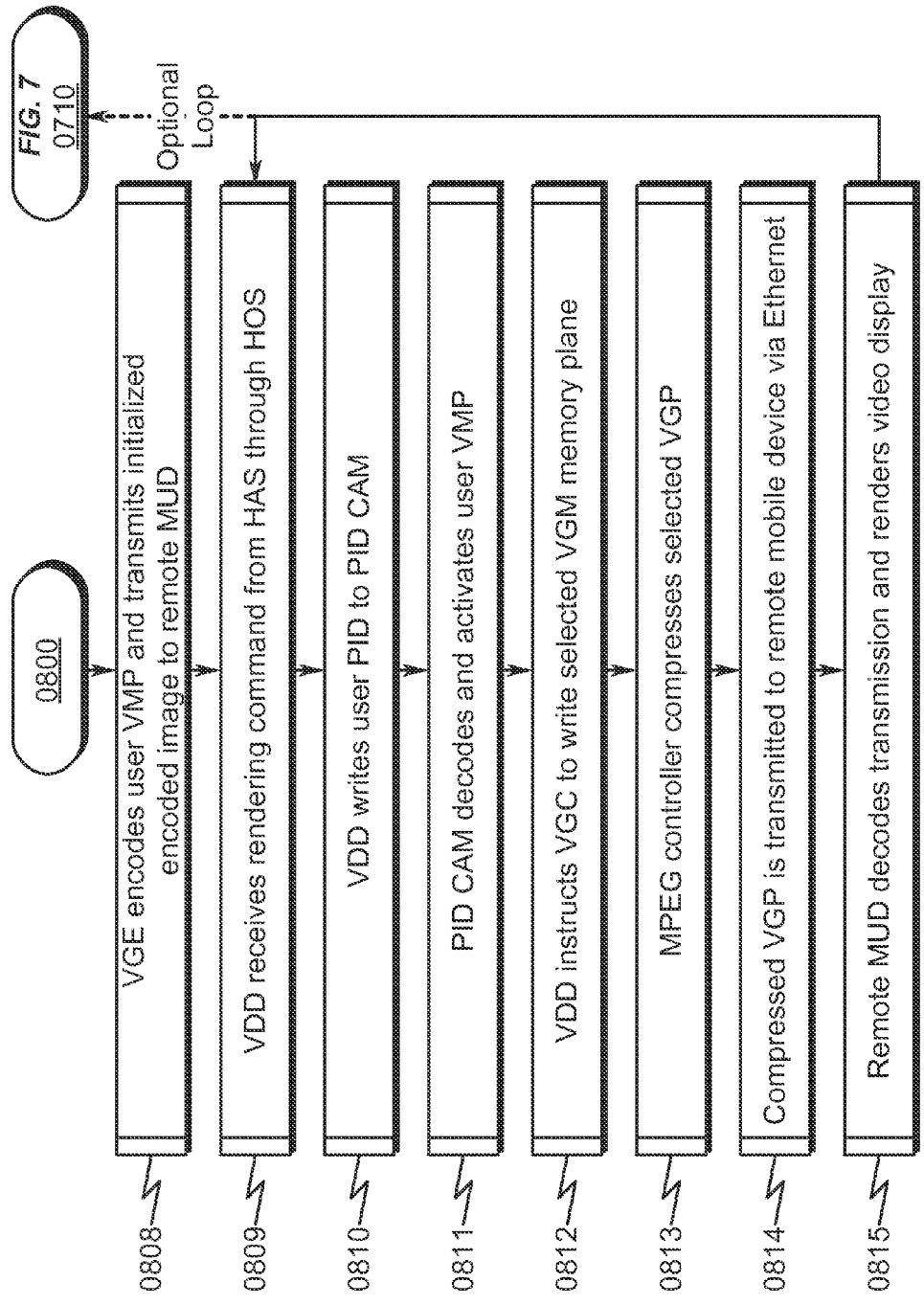
FIG. 8 illustrates a flowchart depicting a preferred exemplary embodiment of the present invention method (page 2 of 2)

Based on the previously described system context, the present invention anticipates a methodology to support multiple user displays in the context of a HOS operating on a HCS within a timesharing and/or multi-tasking application execution environment. In this manner a plurality of users operating remote MUD computing devices may activate a variety of application software on the HCS under control of the HOS and thus share resources (video graphics controller, hard drive, etc.) that would normally be dedicated to a particular user. An exemplary present invention method can be generally described in the flowcharts of FIG. 7 (0700)-FIG. 8 (0800) as incorporating the following steps:

(1) Receiving a request from a remote MUD via a computer communications network (CCN) for user process creation (0701);
(2) Creating a user virtual machine within the HOS operating context on the HCS (0702);
(3) Associating a process ID (PID) with a user virtual machine (VM) application context (0703);
(4) Allocating a memory plane within the VGM VMP stack to support the user video context (0704);
(5) Writing the PID and VMP index to the PID CAM memory (0705);
(6) Activating a software application associated with the user VM context (0706);
(7) Within the video device driver (VDD) initializing the memory plane in VMP associated with PID (0707);
(8) With the video graphics encoder (VGE), encoding the user VMP and transmitting the initialized encoded image to remote MUD (0808);
(9) With the VDD, receiving a rendering command from the HAS through the HOS (0809);
(10) With the VDD, writing the user PID to the PID CAM (0810);
(11) With the PID CAM, decoding and activating the user VMP by matching the user PID to an associated RAM element within the CAM (0811);
(12) With the VDD, instructing the VGC to write selected VGM memory plane with graphics rendering information (0812);
(13) With the video graphics encoder (VGE) controller, compressing the currently selected VGP (0813);
(14) With the VGE, transmitting the compressed VGP to the remote mobile user device (MUD) via an Ethernet hardware interface (0814); and
(15) With the remote MUD, decoding the transmission from the VGE and rendering the decoded video data on the MUD display (0815).

This general method may be modified heavily depending on a number of factors, with rearrangement and/or addition/ deletion of steps anticipated by the scope of the present invention. Integration of this and other preferred exemplary embodiment methods in conjunction with a variety of preferred exemplary embodiment systems described herein is anticipated by the overall scope of the present invention.

Multiplexed Video RAM Architecture (0900)

Figure 9:
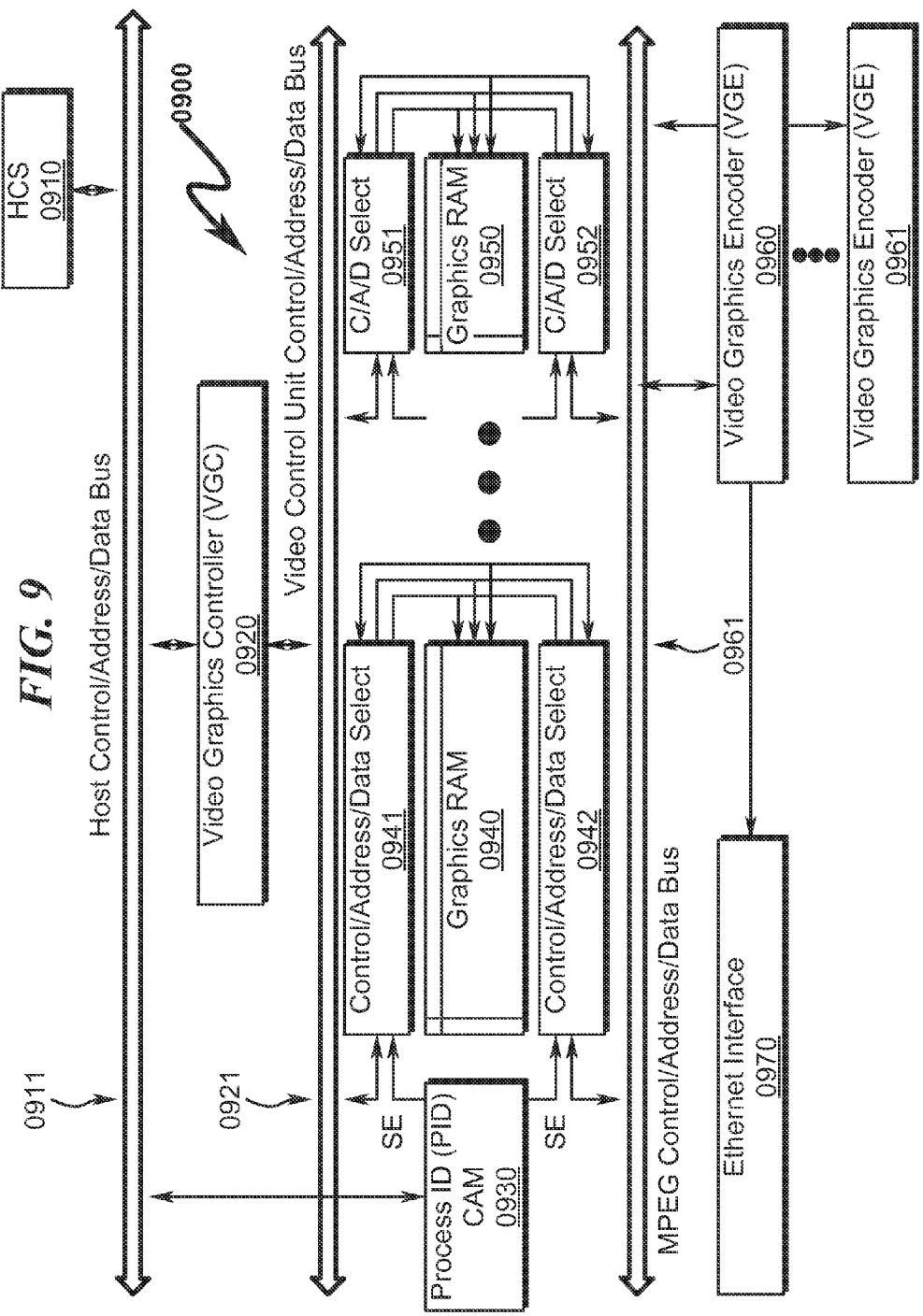
FIG. 9 illustrates a detail system block diagram depicting the shared memory interfaces between the VGC and the VGE.

An overview of the multiplexed video RAM architecture used in many preferred invention embodiments is generally depicted in FIG. 9 (0900). Here it can be observed that the HCS (0910) interacts with a host control/address/data bus (0911) to communicate with the video graphics controller (VGC) (0920). The VGC (0920) has a separate video control unit control/address/data bus (0921) to communicate with video memory containing the representation of the user video display. The present invention augments the VGC (0920) with a process ID (PID) CAM (0930) that may be read/written/ matched by the HCS (0910) under control of the video display driver (VDD) that is responsible for control of the VGC (0920). Setup of the PID CAM (0930) typically involves writing a user process id (PID) into a location in the CAM whose address is associated with a video memory plane reserved for that user application context.

The PID CAM (0930) is written in a MATCH mode by the VDD with the current process ID of the user application context before the first video command sent to the VGC (0920) after an application context switch has occurred in the HOS. This write operation triggers a MATCH function in the PID CAM (0930) that enables selection of RAM memory (0940, 0950) for the VGC (0920) and RAM memory (0940, 0950) access for the video graphics encoder (VGE) (0960). Access to the RAM memory (0940, 0950) is determined by VGC control/address/data select multiplexers (0941, 0951) and video graphics encoder (VGE) control/address/data select multiplexers (0942, 0952). The combination of the VGC control/address/data select multiplexers (0941, 0951) and video graphics encoder (VGE) control/address/data select multiplexers (0942, 0952) permit individual memory planes (0940, 0950) to be isolated and provide for dual port memory access. This control logic may be externally applied to conventional RAM memories or in some circumstances integrated into a common IC package supporting full dual port access to RAM memory with independent CONTROL/ ADDRESS/DATA bus configurations.

As described below the PID CAM (0930) in many preferred embodiments incorporates a two-stage pipeline latch architecture in which MATCH writes to the PID CAM (0930) activate CONTROL/ADDRESS/DATA multiplexors to provide the VGC (0920) access to the memory plane associated with the currently selected user context and simultaneously activate CONTROL/ADDRESS/DATA multiplexors to provide the video graphics encoder (VGE) (0960) access to the memory plane associated with the previously selected user context. In this manner as a memory plane is updated by a user context it may be processed by the video graphics encoder (VGE) when the next user context is activated and another video memory plane is made active. In some preferred embodiments a plurality of video graphics encoders (VGE) (0960, 0961) may be used to encode a number of video memory planes simultaneously. This may be accomplished by increasing the depth of the pipeline latch and providing for additional MPEG CONTROL/ADDRESS/DATA busses to support the addition data of paths to the individual video memory elements.

PID CAM Detail (1000)

Figure 10:
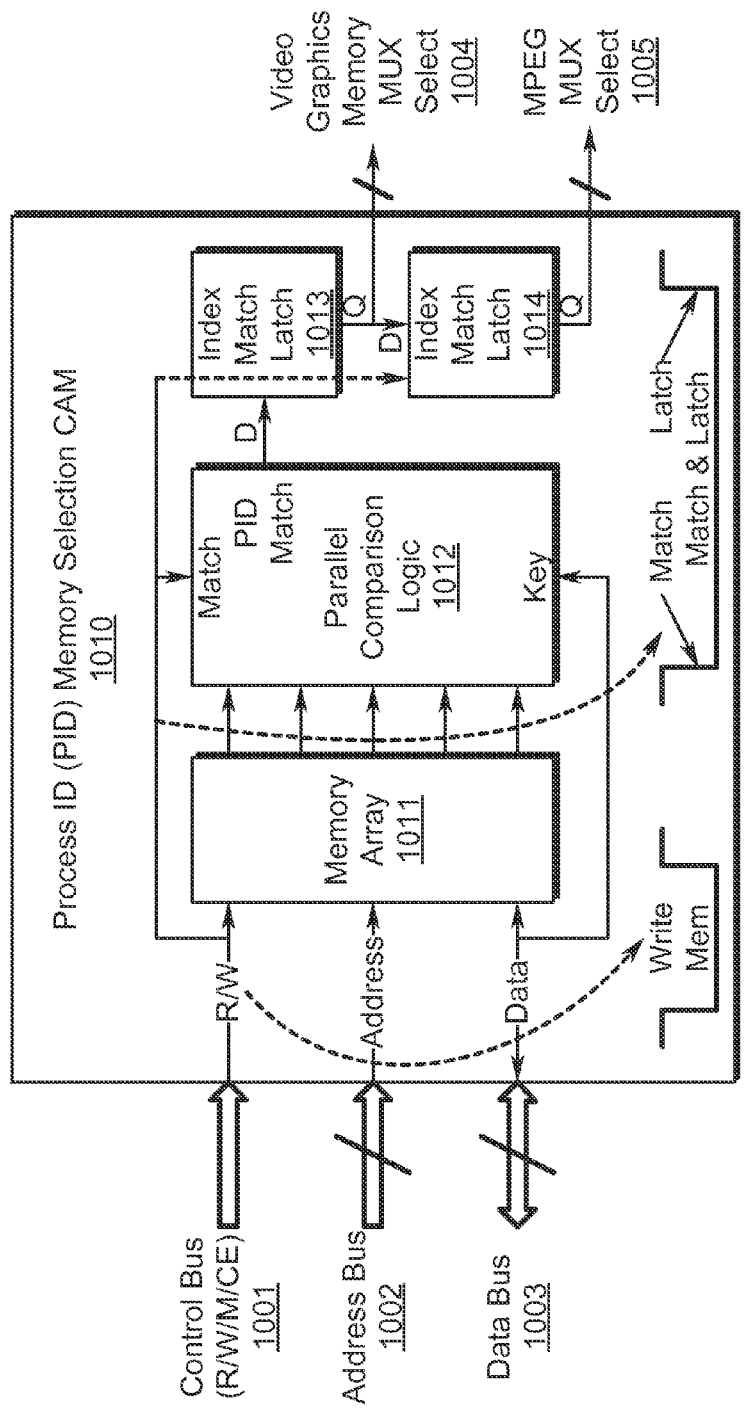
FIG. 10 illustrates a detail system block diagram depicting a multi-stage CAM memory useful in some preferred invention embodiments.

The present invention in many preferred embodiments may make use of a specialized context-associative memory (CAM) to coordinate access to video memory that is shared between the VGC display processor and video graphics encoder (VGE). As generally depicted in FIG. 10 (1000) this custom CAM memory (1010) has as its inputs a control bus (comprising READ (R), WRITE (W), MATCH (M), and CHIP ENABLE (CE) controls (1001)) as well as a conventional ADDRESS bus (1002) and DATA bus (1003) that are used to communicate with the VGC.

This PID CAM (1010) operates as follows. Under control of the HOS VDD, a HOS virtual user PID is written to the memory array (1011) via the DATA bus (1003) using the control bus (1001) (W and CE signals) at a particular address determined by the ADDRESS bus (1002). The particular memory array (1011) address written will be determined by the HOS based on available PID slots for concurrent user processing. This write configuration will generally be associated with the creation of a virtual machine process to support the individual end-user and their request for execution of a software application under control of the HOS.

Once written, the memory array (1011) will be used to compare in parallel incoming key data from the DATA bus (1003) as follows. Whenever a request for graphics output is processed by the HOS, it will activate (or call as a subroutine) procedures in the VDD that interact with the VGC. Before graphics commands are sent to the VGC, the VDD writes the current user PID via the DATA bus (1003) to the PID CAM (1010) and configures the CONTROL bus (1001) for a MATCH operation (CE and M enabled). This triggers the parallel comparison logic (1012) within the PID CAM (1010) to simultaneously match the key data from the DATA bus (1003) against all data stored in the memory array (1011) and determine which if any memory array (1011) address index contains matching PID data. The output of this match operation is fed into a series of sequential latches (1013, 1014) that serve to provide a FIFO of matched PID keys from the memory array (1011).

The output of the first index match latch (1013) serves as the memory address index for the VGC mux selection (1004) and activates access to a particular plane in the video graphics memory array. The output of the second index match latch (1014) serves as the memory address index for the MPEG mux selection (1005) and activates access to a particular plane in the video graphics memory array for the video compression process.

PID CAM Contrast to Prior Art (1100)

Figure 11:
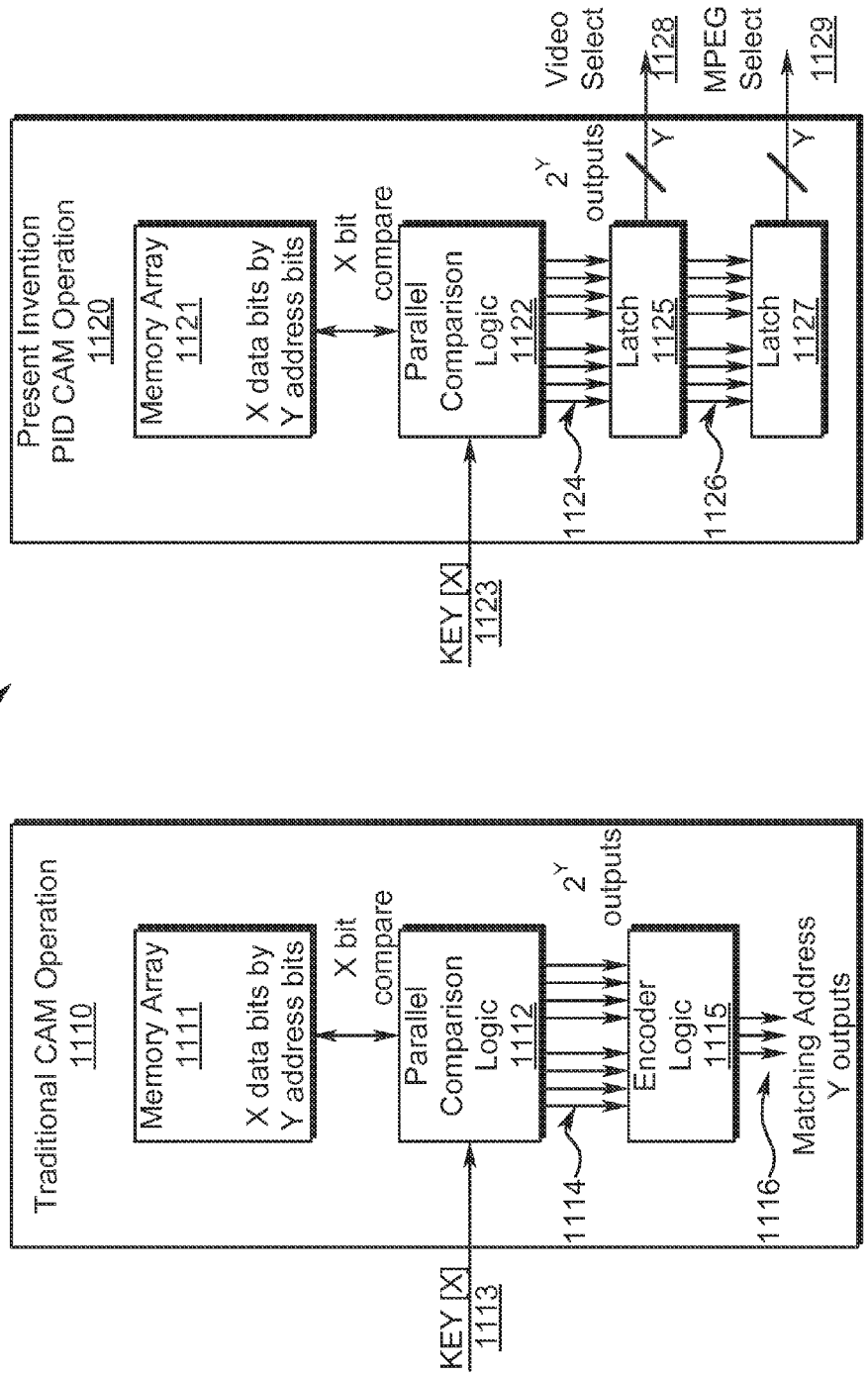
FIG. 11 illustrates a comparison between traditional CAM architectures and the CAM architecture used in the present invention.

More detail of the PID CAM is provided in the comparison diagram depicted in FIG. 11 (1100). Here it can be seen that the traditional CAM operation (1110) incorporates a memory array (1111) and parallel comparison logic (1112) that compares key data (1113) against all the entries in the memory array (1111) and produces parallel match outputs (1114) that are then encoded (1115) to reproduce the encoded address (1116) of the matching memory/key element.

The present invention PID CAM (1120) operates in a similar fashion but with a different mechanism for identifying match conditions. Here it can be seen that the present invention PID CAM operation (1120) incorporates a memory array (1121) and parallel comparison logic (1122) that compares key data (1123) against all the entries in the memory array (1121) and produces parallel match outputs (1124) that are then latched (1125) to provide individual memory select lines (1126) for the graphics controller video memory (1128). Sequential latch data (1125) is fed to a follow-on latch (1127) to store individual memory select lines (1129) for the MPEG memory. While it is possible for the present invention PID CAM to incorporate an encoder (1115) as present in the traditional CAM (1110), it is generally not necessary because the individual match lines provided by the present invention CAM (1120) may be directly used to select individual RAM memories as depicted in FIG. 9 (0900). This elimination of an intermediate encoder/decoder for the memory selection serves to improve overall speed and performance of the system.

This FIFO processing of memory accesses by the PID CAM operates to allow during a given processor time slice access to a given video memory plane that is updated based on activity by a given user process in the context of the overall HOS operation. When the processor time slice is completed, a context switch will occur to another user process at which time the VDD will load another PID into the CAM and select another video memory plane for active write by the graphics controller. Simultaneously, the second follow-on latch (1127) will have as its contents the PREVIOUS memory plane that was written during the previous user application context. The MPEG controller will inspect this memory plane and generate a compressed video output stream from this memory plane and transmit this to a remote MUD via the Ethernet interface on the CPU blade. Thus, the MPEG compression process immediately follows in time the update of a video memory plane by the VDD and VGC.

In this manner updates to a virtualized user video display are immediately compressed by the video graphics encoder (VGE) during the next context switch to another user virtual machine. This allows user application contexts that are idle to not impact the overall performance of the system as without an update to the virtual user graphics display there will be no PID CAM activity for that user process. Since most activity on the end-user MUD consists of "idle" time in which screen content is essentially static, the methodology used in this PID CAM allows a large number of users to simultaneously run applications on a single CPU yet have their video display outputs separated physically by the fact that they have separate and distinct memory associated with the video output.

Furthermore, note that this configuration only requires separate MEMORY to support each individual user application context. While MEMORY is relatively inexpensive, other components in the blade system such as the main CPU, VGC, and Ethernet interface are relatively expensive. Thus, this architecture leverages inexpensive portions of the system and minimizes overall cost associated with more expensive system components. Furthermore, bandwidth utilization is optimized since the video graphics encoder (VGE) will only transmit a compressed representation of CHANGES in the individual user video display content rather than entire screens of raw data as are typically transmitted by VPN remote console applications. The use of MPEG compression also makes use of embedded MPEG hardware decoders present in many MUD devices that would normally be used by the end-user.

Control/Address/Data MUX Detail (1200)

Figure 12:
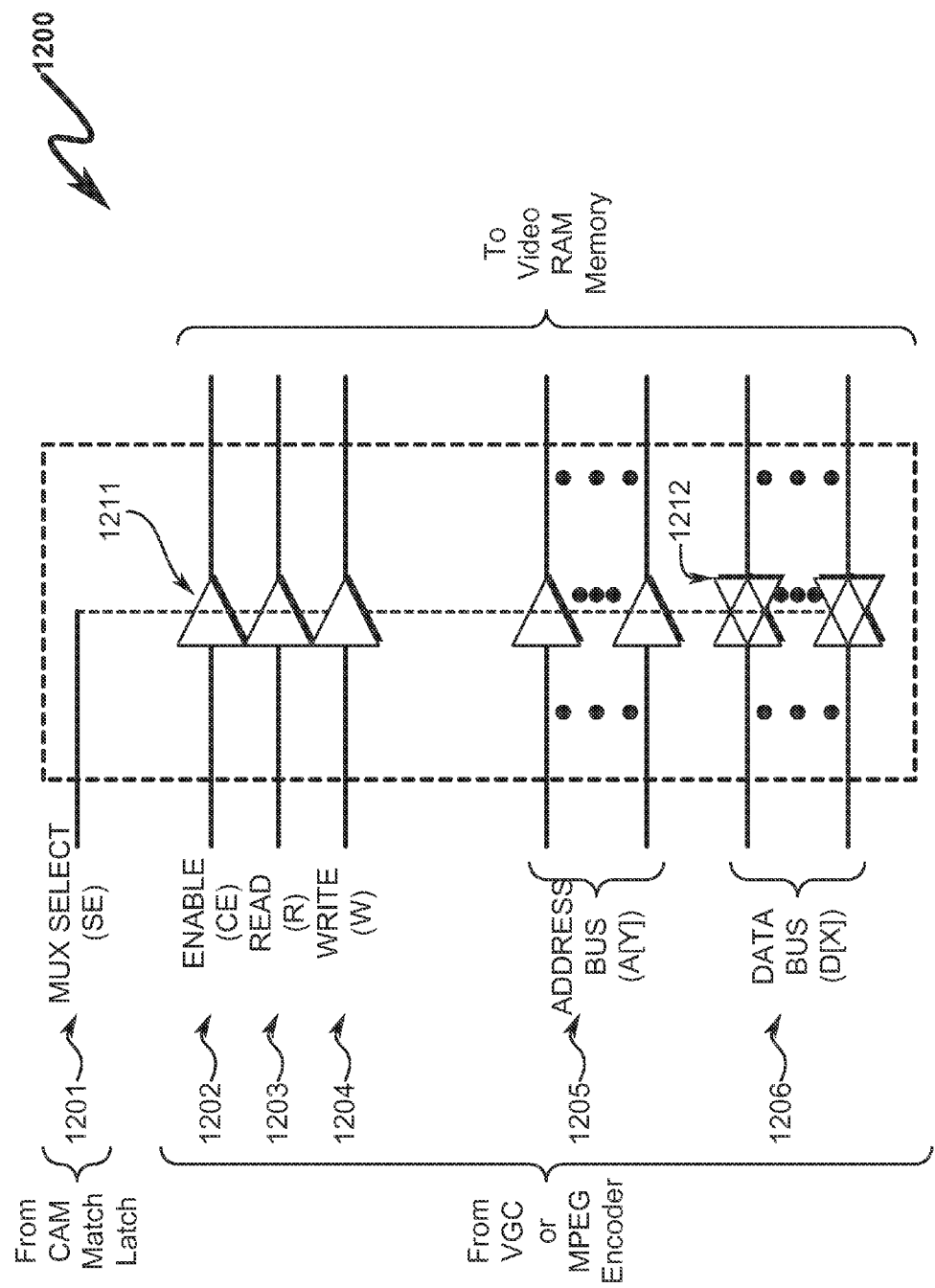
FIG. 12 illustrates exemplary memory access hardware used in the present invention.

The CONTROL/ADDRESS/DATA selection multiplexers (0941, 0942, 0951, 0952) described in FIG. 9 (0900) may be illustrated in further detail in FIG. 12 (1200). Here a typical C/A/D MUX is depicted which is enabled from the PID CAM match latch output (1201). The MUX SELECT enable (SE) is used to gate tri-state buffers (1211) for the control lines (1202, 1203, 1204) and address bus lines (1205) and the enable for transmission gates (1212) (or equivalently back-to-back bidirectional tri-state buffers) associated with the data bus (1206).

Each video RAM memory chip supports conventional chip enable (CE), output enable (R), write enable (W) controls that are used in conjunction with an address bus (A) and data bus (D) to communicate to the video memory. This multiplexing architecture permits both the VGC and video graphics encoder (VGE) access to an individual video RAM but not at the same time. Implementation of the PID CAM ensures that accesses to a given memory RAM by the VGC are followed in time by accesses to that memory RAM by the video graphics encoder (VGE) so that there are never any simultaneous accesses to a given RAM element by both the VGC and video graphics encoder (VGE).

Virtual to Physical Video Mapping Architecture (1300)

Figure 13:
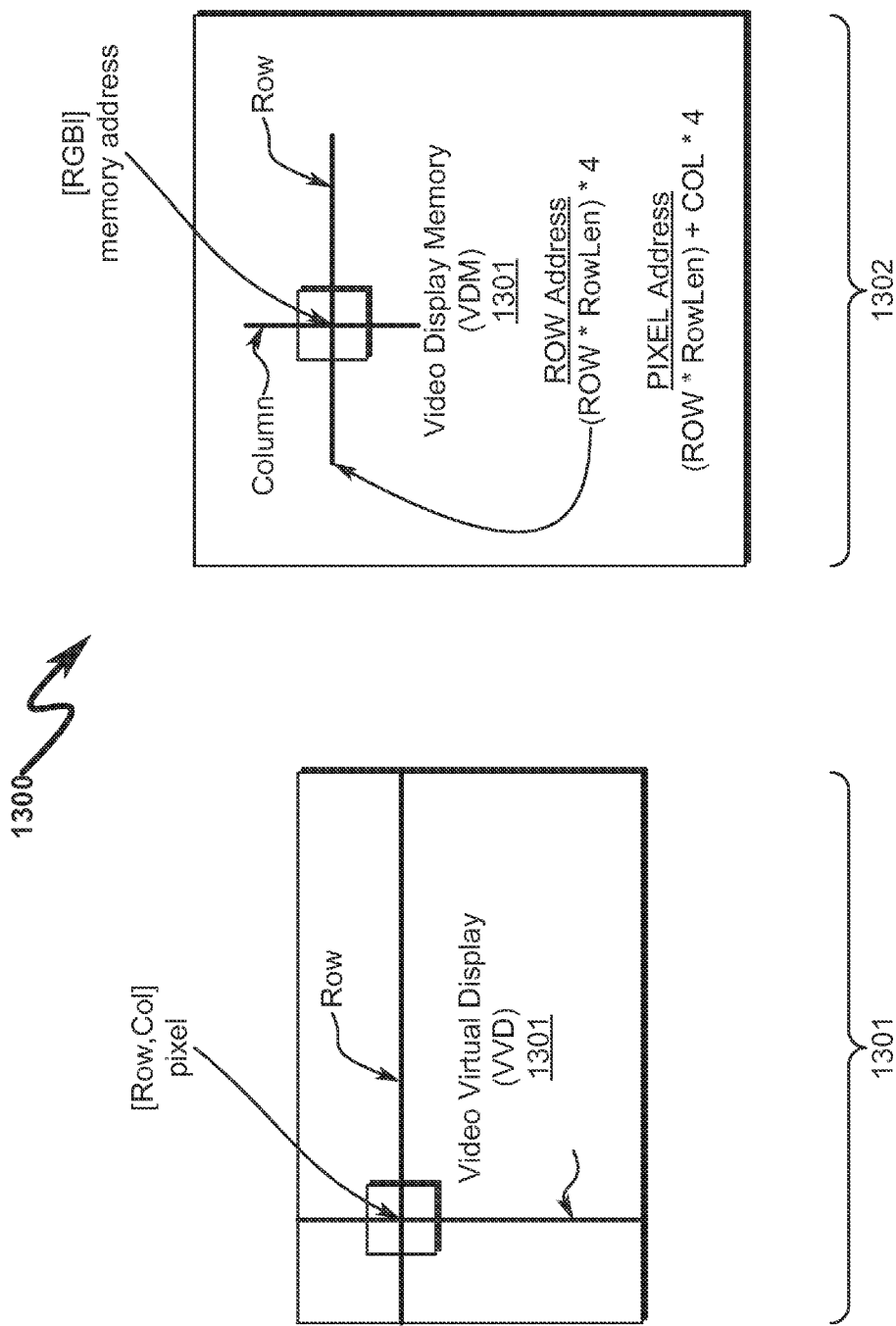
FIG. 13 illustrates an exemplary video memory architecture used in the present invention.

One feature of the present invention that supports improved transmission efficiency of video information to remote MUDs is the identification of areas within the graphics RAM that have been modified by the VGC. To fully understand how this feature is accomplished a view of the graphics memory plane and its relationship to the virtual graphics display is required. As depicted in FIG. 13 (1300), a virtual video display (VVD) (1301) comprises individual pixels (typically having 1, 2, 3, or 4 bytes of color/hue information associated with each pixel) configured in a row/column architecture. Common video pixel sizing configurations may include 640×480, 1024×768, 1140×1080, 1920×1080, 1600×1200, 3840×2160, 4096×2160, and some higher resolutions are also in use. For the purposes of this discussion we will assume 4 bytes/pixel location, as this is a common memory mapping in high quality graphics systems.

Mapping of these VDD resolutions onto physical VGM (1302) is depicted in FIG. 13 (1300) wherein the row and column are mapped by a sequential address register that cycles through each row and each column within the row accessing bytes associated with each pixel (4 bytes in this example) for transfer to the display device for visual interpretation. Traditionally, MPEG encoding of the VGM (1302) would require that the entire memory be scanned to initially generate a baseline for the video compression. This baseline is encoded and transmitted to the remote MUD for initial presentation to the user. Subsequent to this operation, complete scans of the VGM are issued to determine differentials in video content. These differentials in video content are then be encoded and sent to the receiving MUD for decoding and display update on the remote display screen.

An inherent performance issue in this scenario is the fact that the VGE must make complete scans of the VGM to determine the video content differentials. The present invention in many preferred embodiments optimizes this function by incorporating logic within the VGM to note ranges of ROW/COLUMN that have been modified by the VGC. These ranges of video content that are modified are then directly used by the VGE to only use this information for the modified compression frames that are sent to the MUD. This optimization serves two purposes. First, it drastically reduces the amount of computation time necessary for the VGE to determine what has been modified within the VGM. Second, it reduces the bandwidth requirements for access to the VGM by the VGE. These two features in common permit one VGE to service multiple independent virtual user displays in one HCC with the HOS permitting multiple virtual user environments to coexist without the need for individual hardware to support the remote MUD displays.

Region Modification Registers (RMR) (1400)

Figure 14:
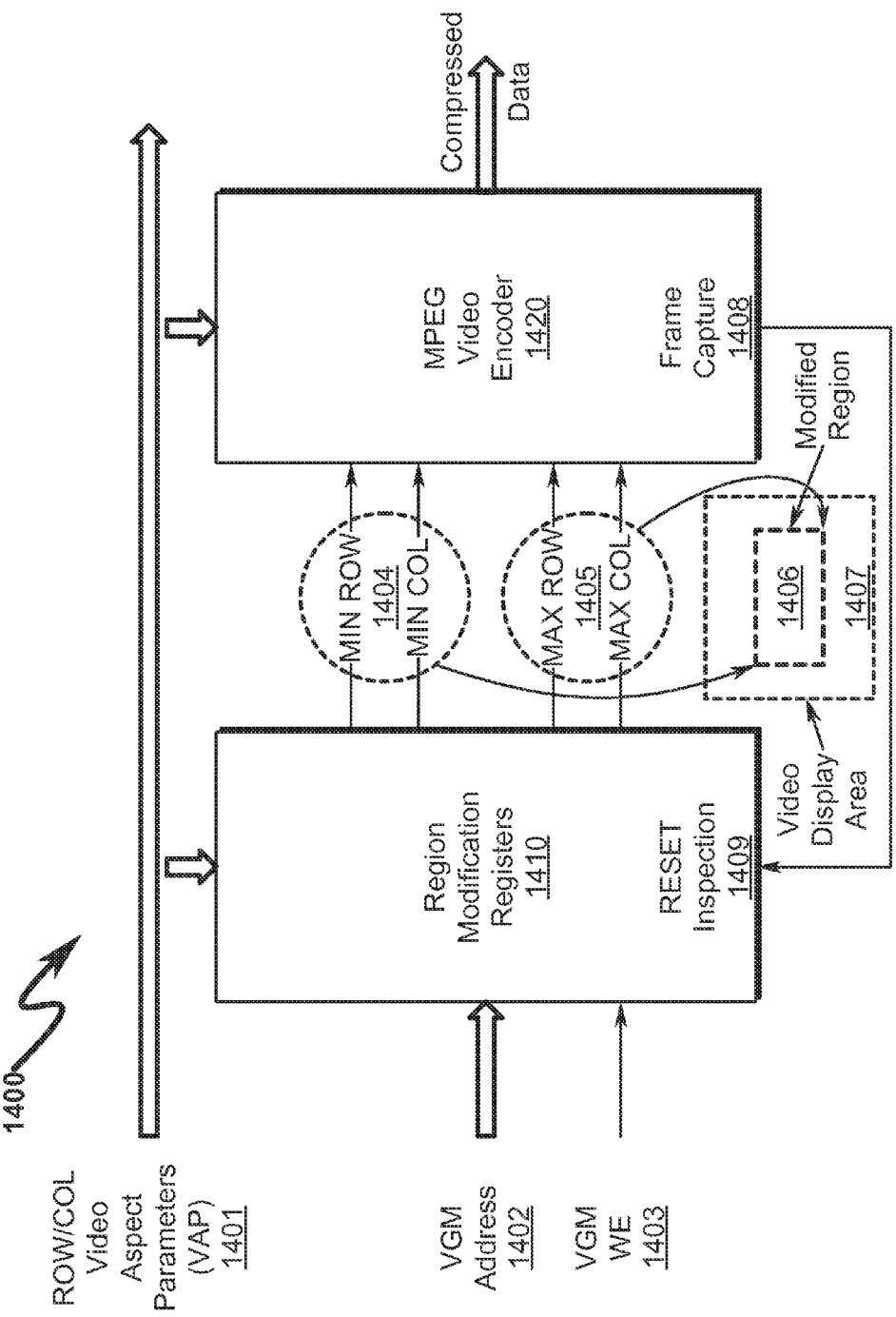
FIG. 14 illustrates an overview of an exemplary region modification register detector used in the present invention.

Consistent with the description in FIG. 13 (1300), a set of region modification registers (RMR) (1410) may be implemented as depicted in FIG. 14 (1400) that determine a range of ROW/COLUMN modifications in the VVD during a predetermined time or event interval. Here the aspect ratio of the virtual video display is presented as video aspect parameter (VAP) (1401) setup data to the RMR (1410) and the VGE (1420) so that information encoded in the VGM may be properly interpreted as illustrated in FIG. 13 (1300). The RMR (1410) receives the VAP (1401) as well as address (1402) and write control (1403) information as the video graphics memory is written by the VGC. With the VAP (1401) and address (1402) information, the RMR (1410) determines a range of minimum ROW/COLUMN (1404) and maximum ROW/COLUMN (1405) that correspond to the modified video display region (1406) within the overall virtual video display (1407) map. This range information (1404, 1405) is generally a subset of the overall virtual display map (1407) and thus permits the VGE (1420) to limit the computational scope of the video compression to just a small portion of the overall virtual video map (1407).

The VGE (1420) may be configured with signaling indicating the beginning of a frame capture (1408) that sets a time window for analysis of the address stream (1402) by the RMR (1410) so that updates to the minimum ROW/COLUMN (1404) and maximum ROW/COLUMN (1405) are reset (1409) during the processing of individual frame modifications that are emitted as compressed data from the VGE (1420).

RMR Detail (1500)

Figure 15:
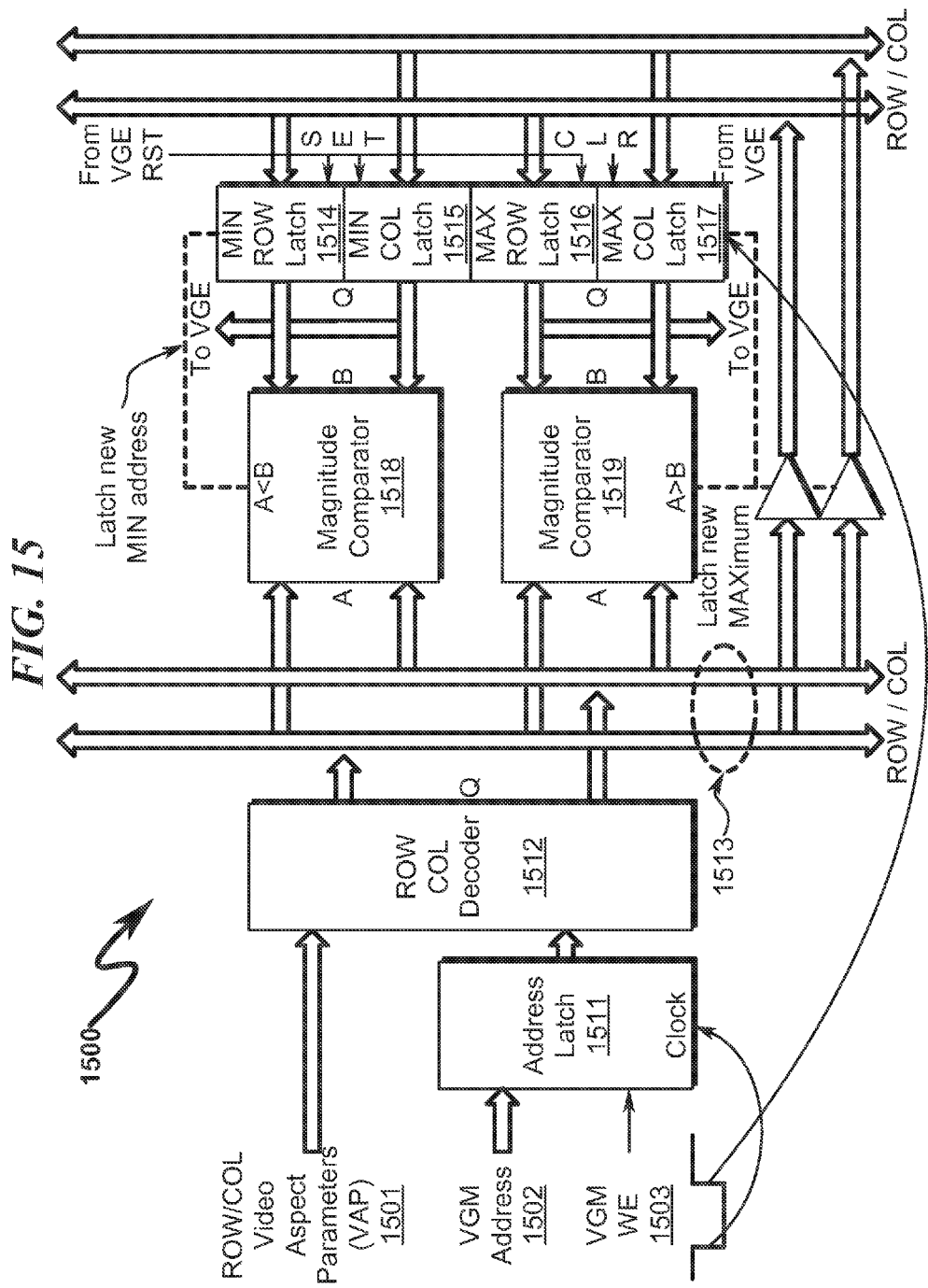
FIG. 15 illustrates detail of an exemplary region modification register detector used in the present invention.

Additional detail on a preferred exemplary RMR implementation is depicted in FIG. 15 (1500). Here the VAP (1501) information is used in conjunction with a VGM address (1502) and the VGM write enable signal (1503) to latch the memory address into a register (1511) typically on the falling edge of the WE signal (1503). The address latch (1511) then feeds a ROW/COLUMN decoder (1512) logic block configured by the VAP (1501) information to produce ROW/COL bus data (1513) representing the associated ROW/COL for the video memory access. The ROW/COL data busses are then compared against MIN ROW/COL latch data (1514, 1515) and MAX ROW/COL latch data (1516, 1517) by magnitude comparators (1518, 1519) configured to detect MIN (1518) and MAX (1519) values respectively. If a new MIN ROW/COL is detected, then the corresponding MIN ROW/COL latches (1514, 1515) are updated. If a new MAX ROW/COL is detected, then the corresponding MAX ROW/COL latches (1516, 1518) are updated. The updated MIN/MAX ROW/COL latch data (1514, 1515, 1516, 1517) is made available to the VGE for use in identifying the area of the video display that has changed and must be compressed and transmitted as an updated video segment to the MUD. As depicted, the VGE may initiate a RST signal to reset the magnitude comparison operation by SETTING the MIN ROW/COL latches (1514, 1515) and CLEARING the MAX ROW/COL latches (1516, 1517). In this manner, the next write operation will generally reset the MIN ROW/COL latches (1514, 1515) and the MAX ROW/COL latches (1516, 1517) to new values associated with the specific area of VGM that is updated by the write cycle from the VGC.

Row/Column Decoder Detail (1600)

Figure 16:
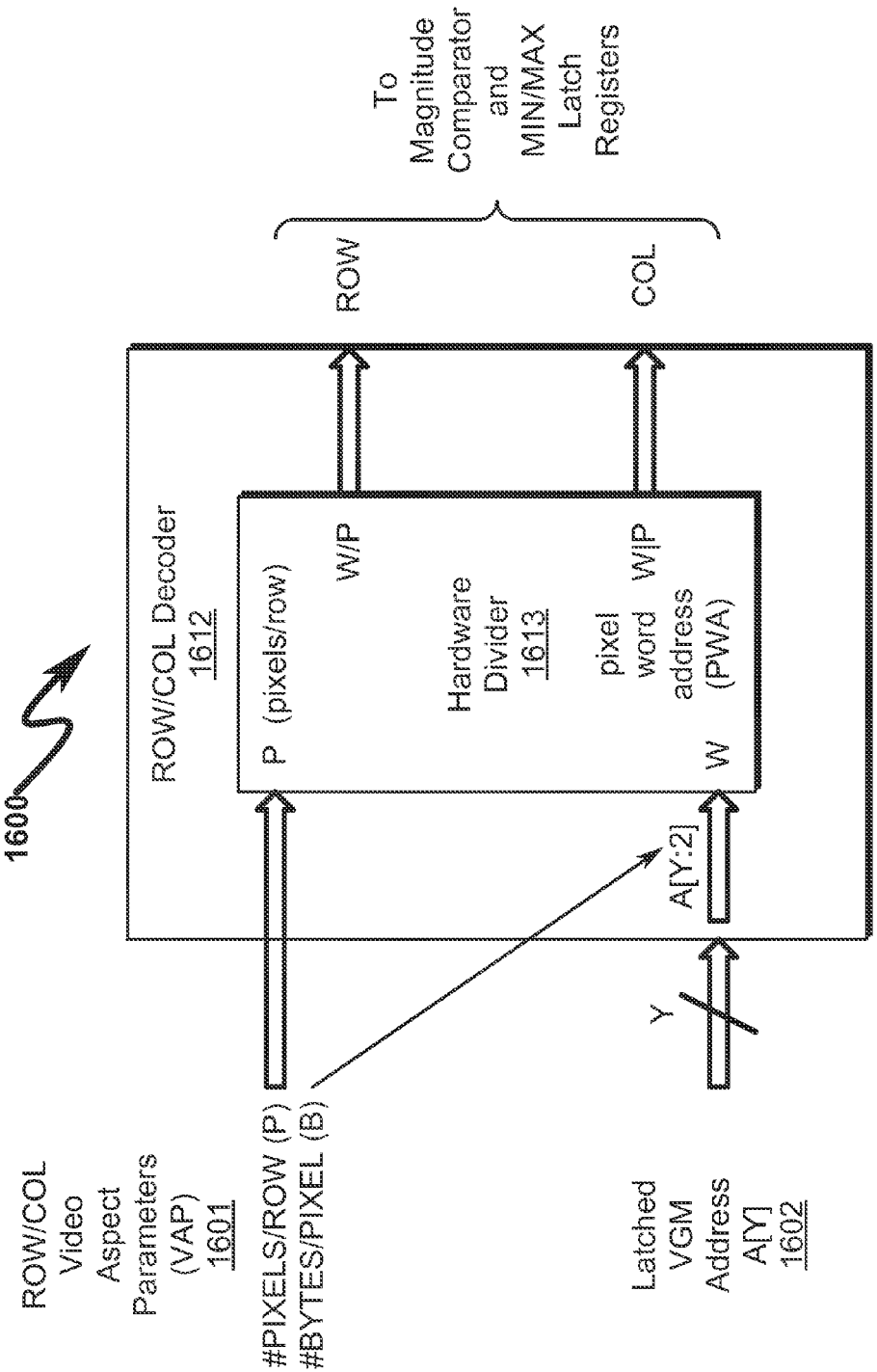
FIG. 16 illustrates an exemplary ROW/COL decoder used in the present invention.

An exemplary implementation of a preferred row/column decoder is depicted in FIG. 16 (1600). Here the VAP (1601) comprises the number of pixels/row (P) and the number of bytes/pixel (B). This VAP (1601) information is used in conjunction with the latched VGM address (1602) to determine the number of bits associated with a pixel address. For example, if the virtual video display has 4 bytes/pixel then the first two address lines of each memory address will be associated with the same pixel (2^2=4). Thus each pixel word address (PWA) has four associated bytes, any of which if modified will result in a VGE processing of that pixel location.

Determination of the individual ROW associated with the particular PWA is calculated using hardware integer division of the PWA by the pixels/row (P) to yield a quotient (W/P) corresponding to the particular row associated with the PWA. Determination of the individual COL associated with the particular PWA is calculated using modulo integer division of the PWA by the pixels/row (P) to yield a remainder (W|P) corresponding to the particular column associated with the PWA. Since the pixels/row (P) value does not assume arbitrary values and as stated previously may be generally limited to a number of known constant values associated with common video aspect ratios such as 640[×480], 1024[×768], 1140[×1080], 1920[×1080], 1600[×1200], 3840[×2160], 4096[×2160]. Each of these individual divisors may be used with specialized division hardware to perform the division and remainder process using a pseudo-division process.

A variety of hardware accelerated division methods may be used to quickly calculate the quotient (W/P) and remainder (W|P) for the above ROW/COL decoder. One such method involves multiplication of the dividend by the reciprocal of the fixed constant divisor using SHIFT and ADD operations. To illustrate this method, consider the simple case of dividing the PWA by 3. The reciprocal of 3, in binary, is approximately 0.0101 0101 0101 0101 0101 0101 0101 0101. As an example, a pseudo-division by the constant 3 may take the form of the following hardware process:

unsigned divu3 (unsigned n) {
unsigned q, r;
q=(n>>2)+(n>>4); //q=n*0.0101 (approx)
q=q+(q>>4); //q=n*0.01010101
q=q+(q>>8);
q=q+(q>>16);
r=n−q*3; //0<=r<=15
return q+(11*r>>5); //Returning q+r/3
//return q+(5*(r+1)>>4); (Option #1)
//return q+((r+5+(r<<2))>>4); (Option #2)
}

Each of the functions described above may be implemented by simple hardware ADD functions as well as SHIFT operators which are well known in the art and can be implemented much faster than conventional multiply/divide instructions associated with traditional digital computers. The multiply instruction may also be implemented using SHIFT and ADD hardware. Thus, this ROW/COL decoder can be configured to divide by fixed constants associated with the pixels/row and rapidly generate a ROW/COL that is then compared against MIN/MAX values to define a modification region that is loaded into the RMR registers for inspection by the VGE to define the area of the virtual video display that must be updated to the MUD.

Data Flow (1700)-(2400)

Figure 17:
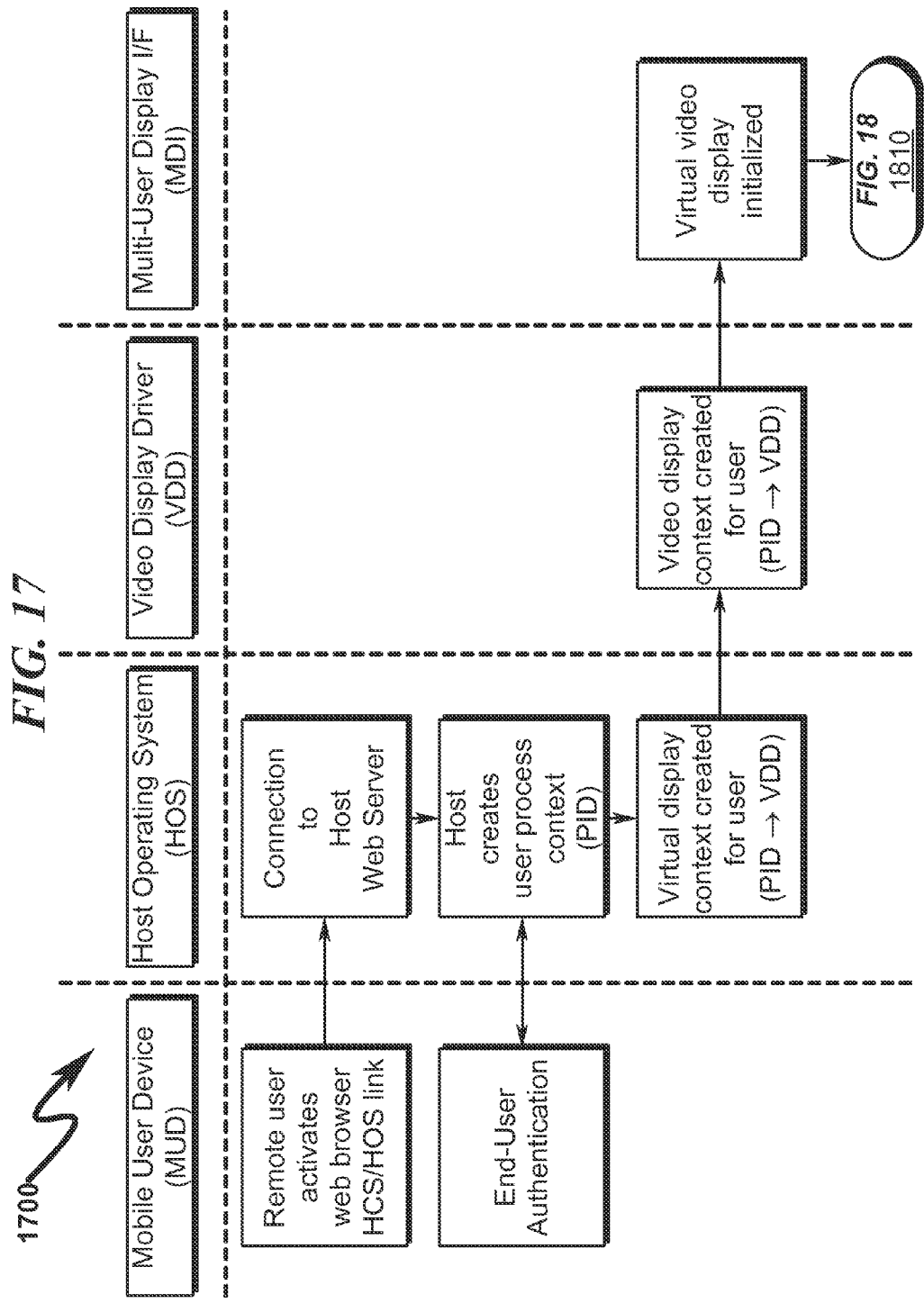
Figure 18:
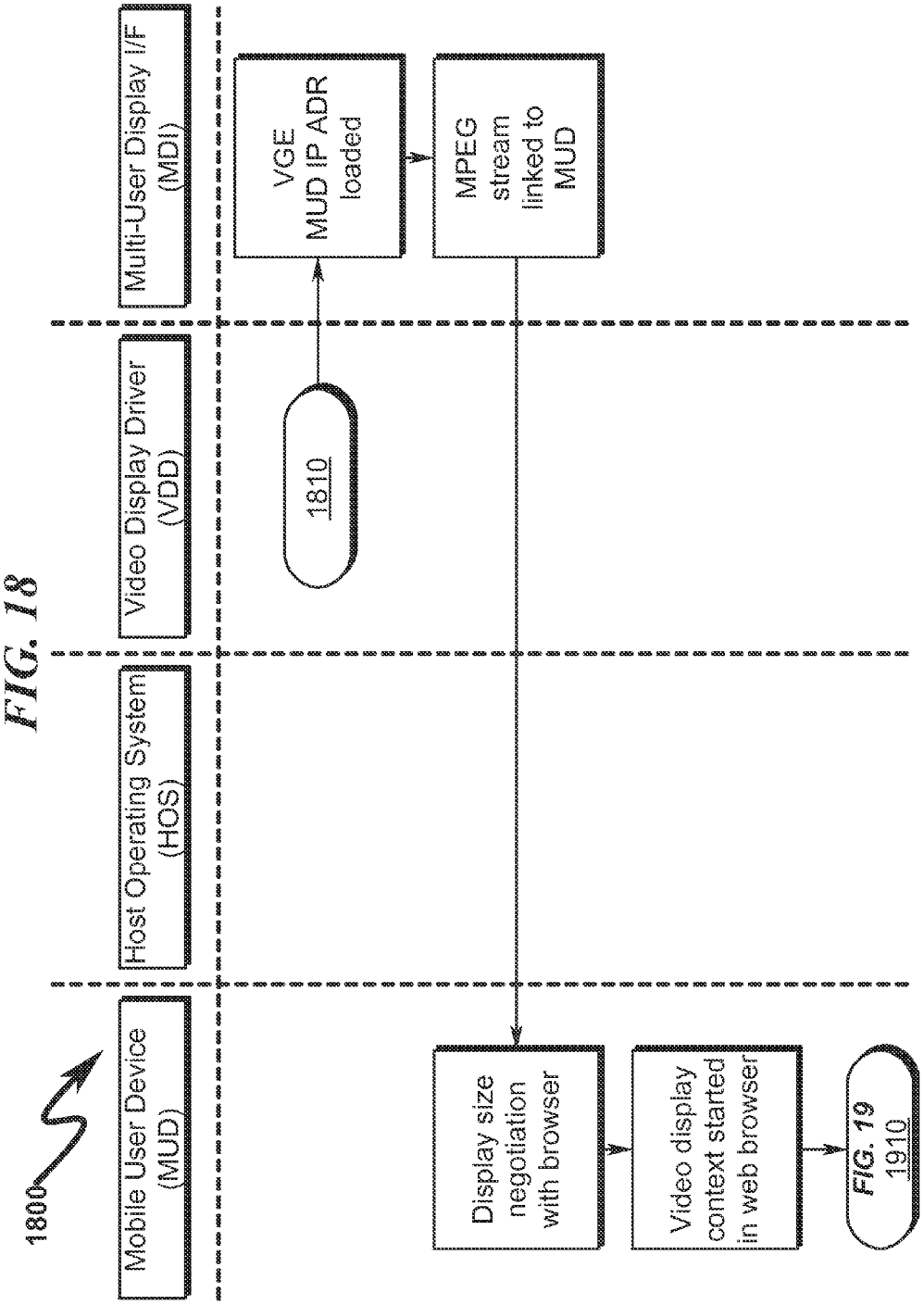
Figure 19:
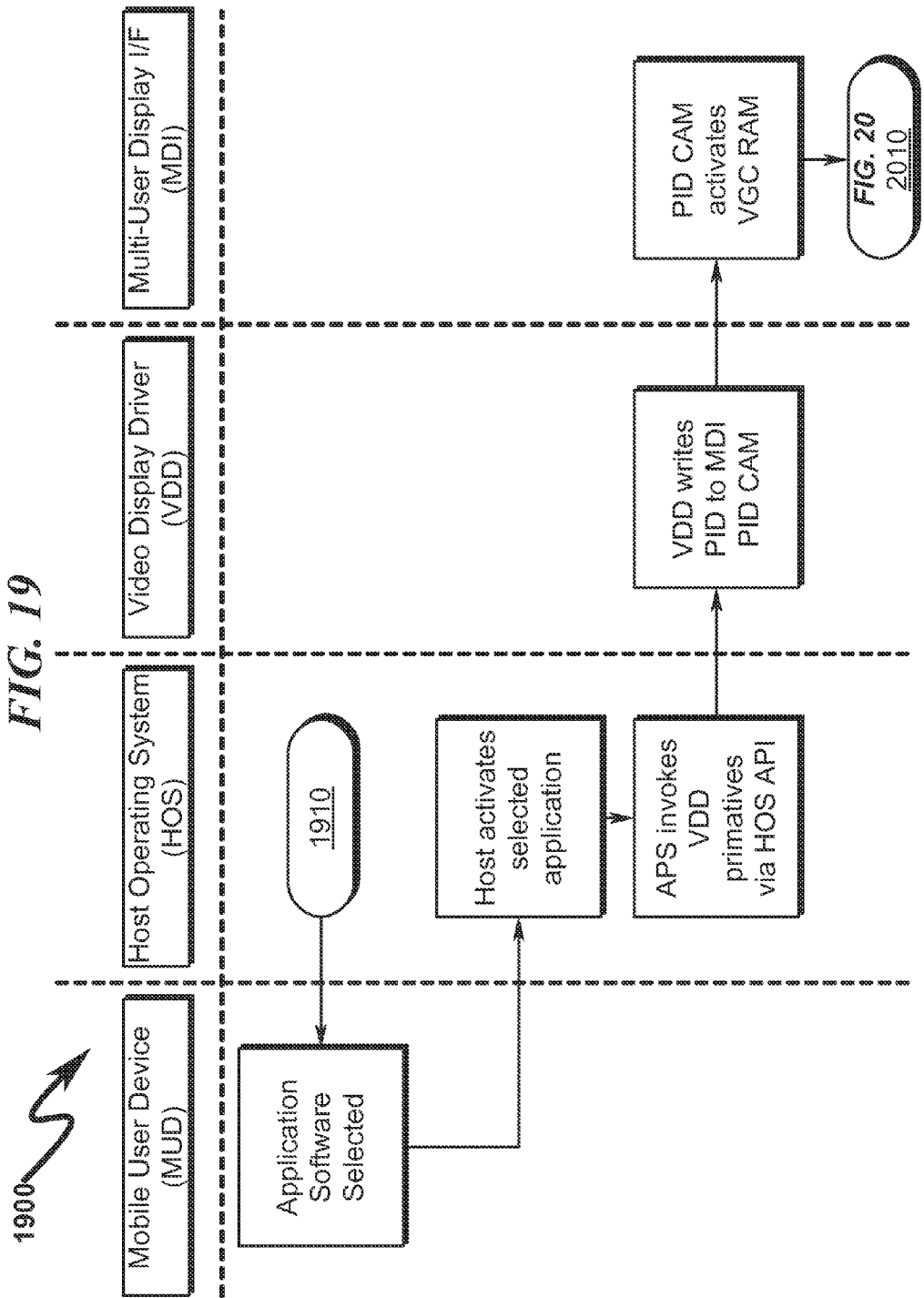
Figure 20:
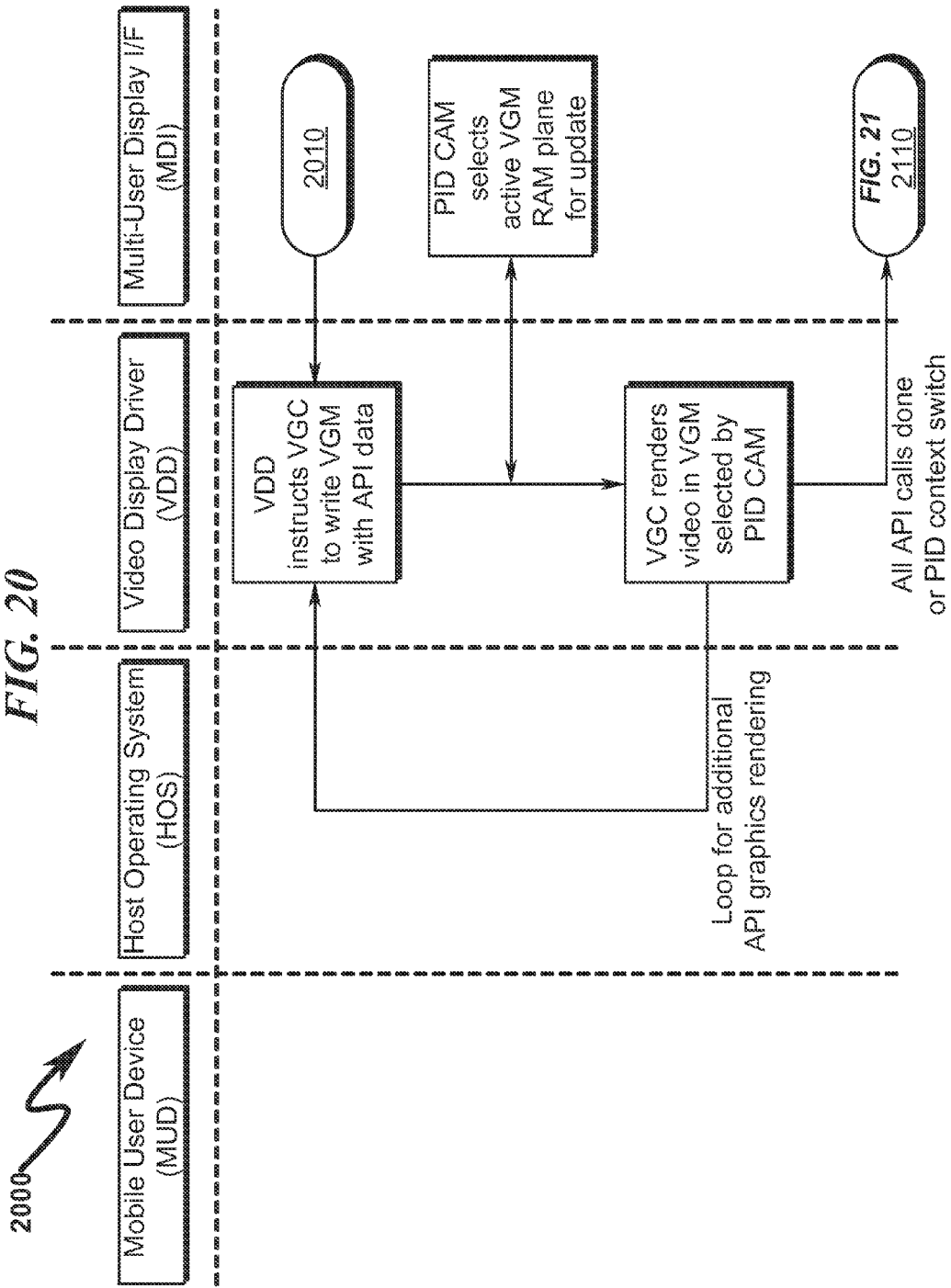
Figure 21:
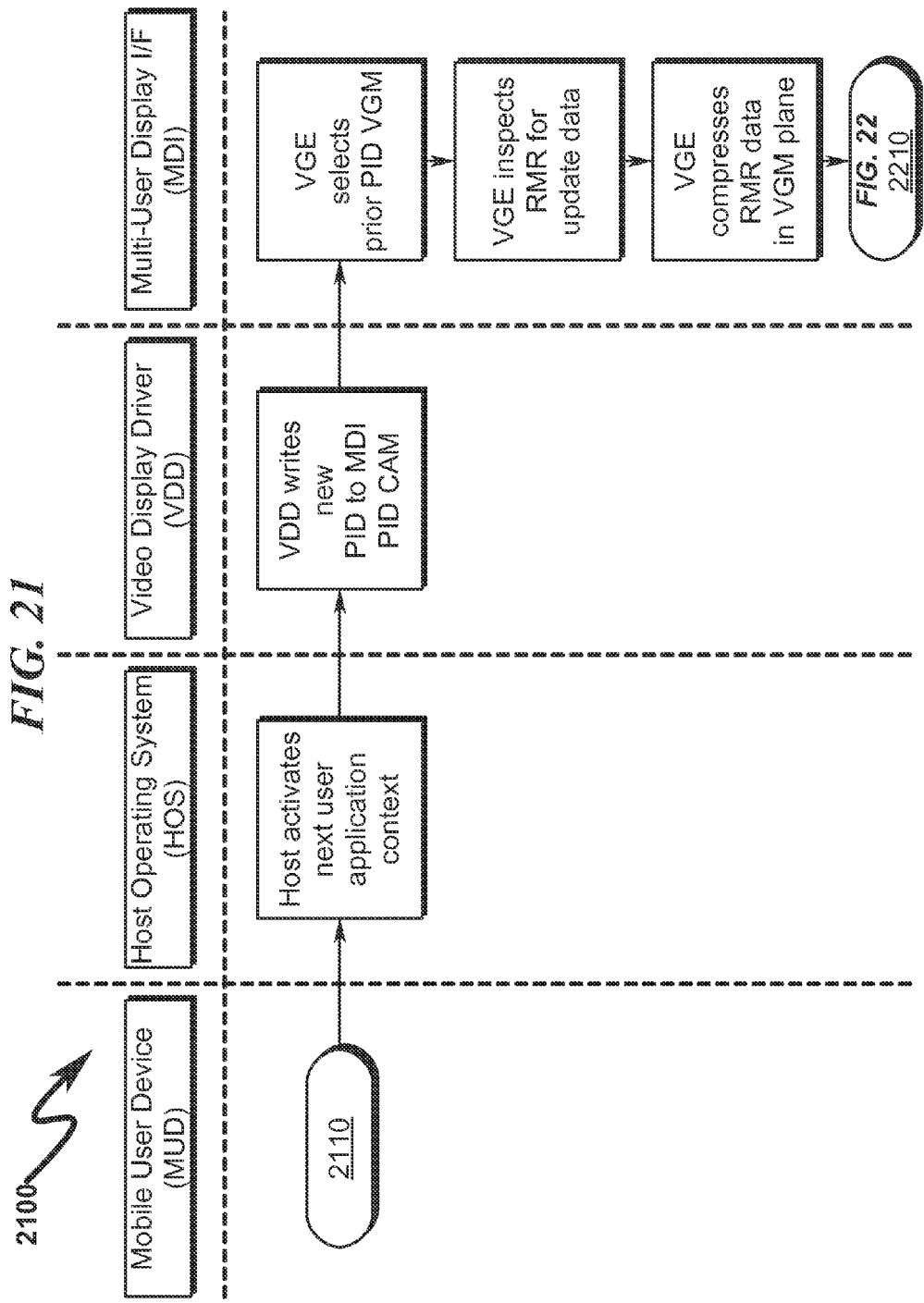
Figure 22:
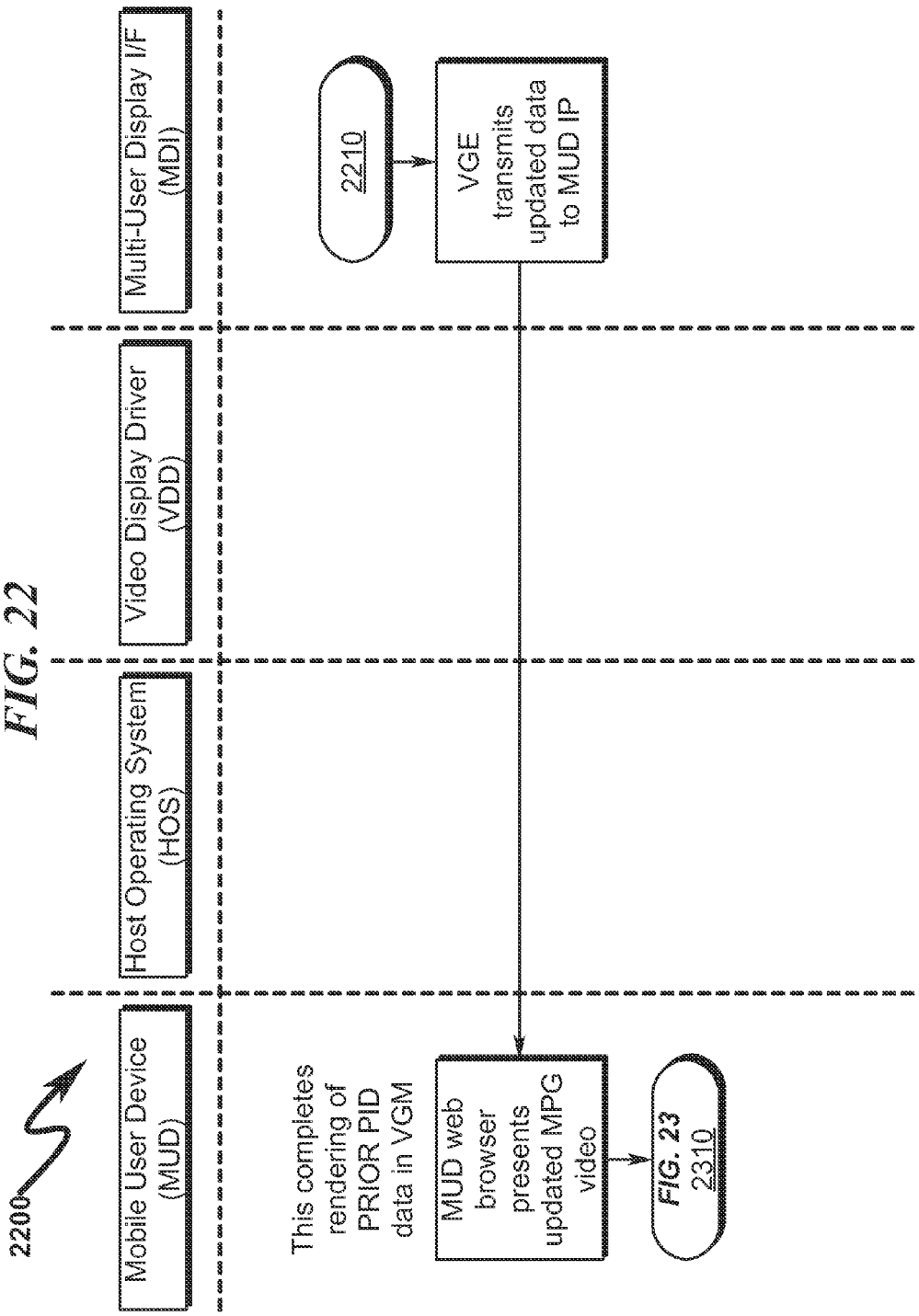
Figure 23:
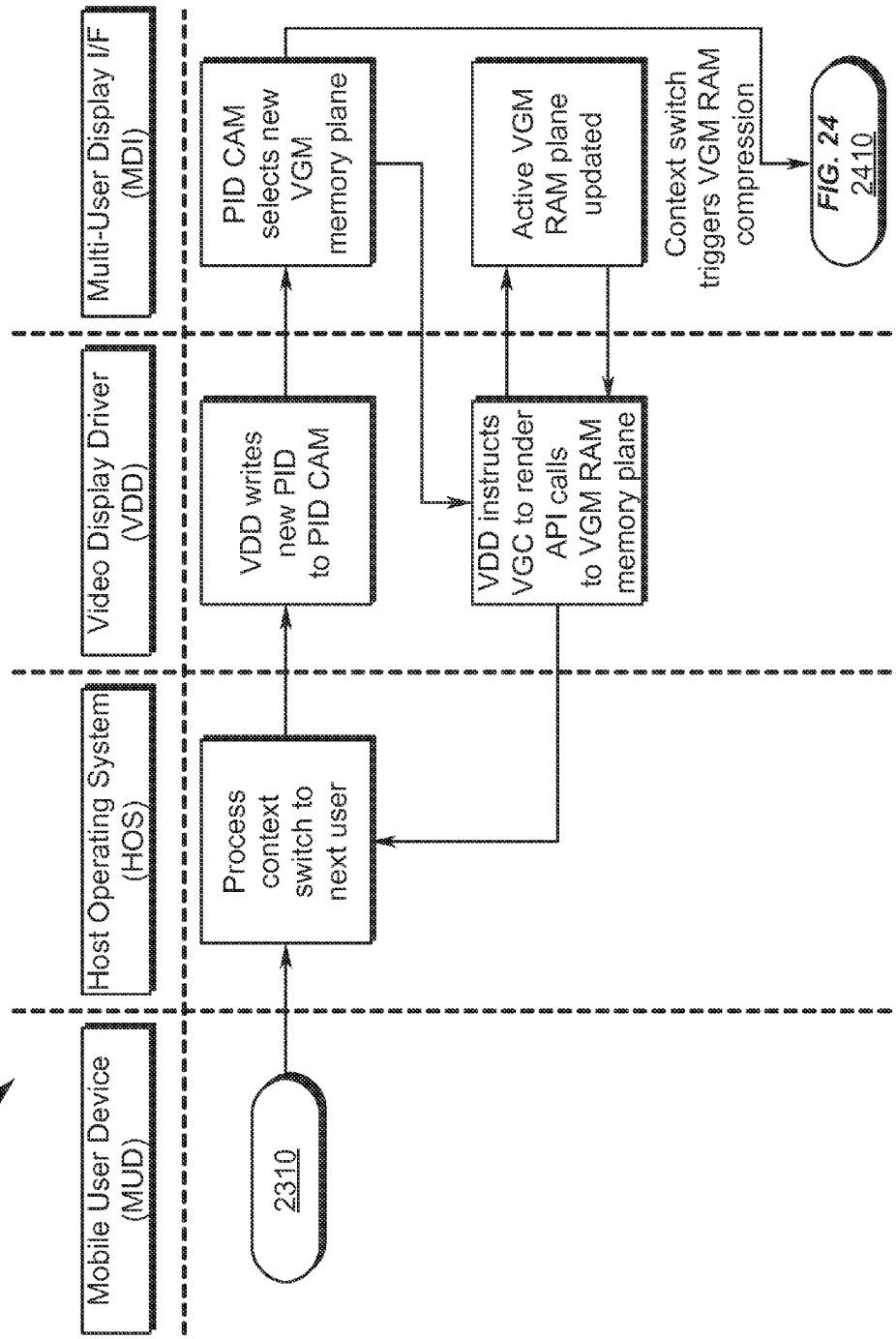

FIG. 17 (1700)-FIG. 24 (2400) provide an exemplary data flow for the present invention and illustrate how multiple user displays may be supported within a single host operating system (HOS) environment. The data flow is depicted as including the MUD, HOS, VDD, and associated with the multi-user display hardware interface (MDI) interface described previously. These data flows contain sufficient detail for one of ordinary skill in the art to implement the present invention and coordinate interactions with the MDI among the various hardware and software systems in a blade implementation of a multi-user display architecture. While these data flows depict a typical interaction scenario, the present invention is not necessarily limited by these depicted data flows.

System Summary

The present invention system anticipates a wide variety of variations in the basic theme of construction, but can be generalized as a multi-user display system comprising:
  (a) video graphics controller (VGC);
  (b) umber 2283, process ID CAM (CAM);
  (c) process ID CAM (CAM);
  (d) video graphics encoder (VGE);
  (e) serial communication channel (SCC); and
  (f) computer communication network (CCN);
wherein
  the VGC is configured to accept display control commands (DCC) from a host computer system (HCS);
  the HCS is configured to execute host operating system software (HOS) machine instructions read from a computer readable medium;
  the HOS comprises a video device driver (VDD) configured to translate application software graphics commands into the DCC via an application programming interface (API);
  the VGC is configured to apply the DCC to an active display plane (ADP) within the VGM;
  the ADP within the VGM is selected by data stored in the CAM;
  the CAM is configured to store a plurality of process ID (PID) values associated with a corresponding specific virtual machine user (VMU) within the context of the HOS and associated with the plurality of PID values with a corresponding plurality of video graphics memory planes (VGP) in the VGM;
  the CAM is configured to simultaneously compare a process ID (PID) sent to the CAM when a MATCH CAM function is sent to the CAM and produce an ENABLE signal corresponding to the index of a matching location in the CAM;
  the HOS further comprises a video display driver (VDD) operating under direction of the HOS that controls the operation the VGC;
  the VDD is configured to write the CAM with the process ID (PID) of a currently active user before sending a graphics rendering command to the VGC;
  the CAM is configured to select a VGP corresponding to the active user after the CAM write;
  the VGC is configured to render graphics information to the selected VGP after the VGP selection; and
  the VGE is configured to compress the video content of the selected VGP and transmit the compressed video content through the SCC to a mobile user device (MUD) via the CCN.

This general system summary may be augmented by the various elements described herein to produce a wide variety of invention embodiments consistent with this overall design description.

Method Summary

The present invention method anticipates a wide variety of variations in the basic theme of implementation, but can be generalized as a multi-user display method comprising:

(1) Receiving a request from a remote mobile user device (MUD) via a computer communications network (CCN) for user process creation;
(2) Creating a user virtual machine (UVM) within a host operating system (HOS) operating context on a host computer system (HCS);
(3) Associating a process ID (PID) with an application context for the UVM;
(4) Allocating a memory plane within a video graphics memory (VGM) video memory plane (VMP) stack to support a user video context (UVC) for the UVM;
(5) Writing the PID and index of the VMP to a PID CAM memory;
(6) Activating host application software (HAS) associated with the UVC within the UVM;
(7) Within a video device driver (VDD) operating under control of the HOS, initializing a memory plane in the VMP associated with the PID;
(8) With a video graphics encoder (VGE), encoding a VMP associated with the UVC and transmitting an encoded image to the MUD via the CCN;
(9) With the VDD, receiving a rendering command from the HAS through the HOS;
(10) With the VDD, writing the PID to the PID CAM;
(11) With the PID CAM, decoding and activating a user VMP by matching a user PID to an associated RAM element within the CAM;
(12) With the VDD, instructing a video graphics controller (VGC) to write a selected memory plane in the VGM with graphics rendering information;
(13) With a video graphics encoder (VGE) controller, compressing a selected memory plane in the VGM to produce a compressed VGP;
(14) With the VGE, transmitting the compressed VGP to the MUD via serial communication controller (SCC); and
(15) With the MUD, decoding the transmission from the VGE and rendering the decoded video data on a display on the MUD.

This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the SCC comprises an Ethernet hardware interface.
An embodiment wherein the CCN comprises the Internet.
An embodiment wherein the HOS comprises a MICROSOFT® WINDOWS® operating system.
An embodiment wherein the MUD is selected from a group consisting of: smartphone; IPHONE®; cellular phone; computer tablet; IPAD®; laptop; and desktop computer.
An embodiment wherein the VGE implements a video compression format selected from a group consisting of: MPEG; MPEG-2; MPEG-4; H.264; THEORA; WEBM; DIRAC; REALVIDEO; VP8; and HEVC.
An embodiment wherein the CAM further comprises a two-stage output latch configured to produce an ENABLE signal for the VGM corresponding to a current user graphics plane selection and an ENABLE signal for the VGM corresponding to a prior user graphic plane selection.
An embodiment wherein the VGE comprises a plurality of video graphics compression integrated circuits configured to simultaneously and independently encode video information contained in multiple graphics memory planes within the VGM.
An embodiment wherein the VGM further comprises a Region Modification Register (RMR) configured to compute a rectangle of MIN ROW/COL and MAX ROW/COL writes constituting rendered video modifications to the VGM by the VGC.
An embodiment wherein the RMR further comprises a ROW/COL decoder configured to calculate a modification ROW by dividing an address of the VGM by a pixels/row video aspect parameter (VAP) and a modification COL by generating the division remainder of the address of the VGM by the pixels/row video aspect parameter (VAP).

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., hard disks and USB thumb drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to *In re Beauregard*, 35 USPQ2d 1383 (U.S. Pat. No. 5,710,578), the present invention anticipates and includes this type of computer readable media within the scope of the invention. Pursuant to *In re Nuijten*, 500 F.3d 1346 (Fed. Cir. 2007) (U.S. patent application Ser. No. 09/211,928), the present invention scope is limited to computer readable media wherein the media is both tangible and non-transitory.

CONCLUSION

A system and method implementing a multi-user display linking multiple independent software processes with remote mobile devices has been disclosed. The system/method augments multiple planes of conventional video graphics memory (VGM) controlled by a video graphics controller (VGC) in a host computing context (HCC) with a plane selection register (PSR) that enables isolation of individual planes of video memory within the VGM. The PSR is associated with a process mapping table (PMT) that maps in hardware a user process identification (PID) associated with an individual software process running within the HCC under control of a host operating system (HOS). HOS process context changes update the PSR with PMT content corresponding to an active HCC PID. A video graphics encoder (VGE) inspects areas of change within individual VGM planes and emits these changes as streaming video content to an Ethernet interface communicating with remote mobile devices associated with the HCC PIDs.

Claims Interpretation

The following rules apply when interpreting the CLAIMS of the present invention:

- The CLAIM PREAMBLE should be considered as limiting the scope of the claimed invention.
- "WHEREIN" clauses should be considered as limiting the scope of the claimed invention.
- "WHEREBY" clauses should be considered as limiting the scope of the claimed invention.
- "ADAPTED TO" clauses should be considered as limiting the scope of the claimed invention.
- "ADAPTED FOR" clauses should be considered as limiting the scope of the claimed invention.
- The term "MEANS" specifically invokes the means-plus-function claims limitation recited in 35 U.S.C. §112(f) and such claim shall be construed to cover the corresponding structure, material, or acts described in the specification and equivalents thereof.
- The phrase "MEANS FOR" specifically invokes the means-plus-function claims limitation recited in 35 U.S.C. §112(f) and such claim shall be construed to cover the corresponding structure, material, or acts described in the specification and equivalents thereof.
- The phrase "STEP FOR" specifically invokes the step-plus-function claims limitation recited in 35 U.S.C. §112(f) and such claim shall be construed to cover the corresponding structure, material, or acts described in the specification and equivalents thereof.
- The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").
- The claims presented herein are to be interpreted in light of the specification and drawings presented herein with sufficiently narrow scope such as to not preempt any abstract idea.
- The claims presented herein are to be interpreted in light of the specification and drawings presented herein with sufficiently narrow scope such as to not preclude every application of any idea.
- The claims presented herein are to be interpreted in light of the specification and drawings presented herein with sufficiently narrow scope such as to preclude any basic mental process that could be performed entirely in the human mind.
- The claims presented herein are to be interpreted in light of the specification and drawings presented herein with sufficiently narrow scope such as to preclude any process that could be performed entirely by human manual effort.

What is claimed is:

1. A multi-user display system comprising:
(a) video graphics controller (VGC);
(b) video graphics memory (VGM);
(c) process ID context associative memory CAM (CAM);
(d) video graphics encoder (VGE);
(e) serial communication channel (SCC); and
(f) computer communication network (CCN);
wherein
said VGC is configured to accept display control commands (DCC) from a host computer system (HCS);
said HCS is configured to execute host operating system software (HOS) machine instructions read from a computer readable medium;
said HOS comprises a video device driver (VDD) configured to translate application software graphics commands into said DCC via an application programming interface (API);
said VGC is configured to apply said DCC to an active display plane (ADP) within said VGM;
said ADP within said VGM is selected by data stored in said CAM;
said CAM is configured to store a plurality of process ID (PID) values associated with a corresponding specific virtual machine user (VMU) within the context of said HOS and associated said plurality of PID values with a corresponding plurality of video graphics memory planes (VGP) in said VGM;
said CAM is configured to simultaneously compare a process ID (PID) sent to said CAM when a MATCH CAM function is sent to said CAM and produce an ENABLE signal corresponding to the index of a matching location in said CAM;
said HOS further comprises a video display driver (VDD) operating under direction of said HOS that controls the operation said VGC;
said VDD is configured to write said CAM with the process ID (PID) of a currently active user before sending a graphics rendering command to said VGC;
said CAM is configured to select a VGP corresponding to said active user after said CAM write;
said VGC is configured to render graphics information to said selected VGP after said VGP selection; and
said VGE is configured to compress the video content of said selected VGP and transmit said compressed video content through said SCC to a mobile user device (MUD) via said CCN.

2. The multi-user display system of claim 1 wherein said SCC comprises an Ethernet hardware interface.

3. The multi-user display system of claim 1 wherein said CCN comprises the Internet.

4. The multi-user display system of claim 1 wherein said HOS comprises a MICROSOFT WINDOWS operating system.

5. The multi-user display system of claim 1 wherein said MUD is selected from a group consisting of: smartphone; IPHONE; cellular phone; computer tablet; IPAD; laptop; and desktop computer.

6. The multi-user display system of claim 1 wherein said VGE implements a video compression format selected from a group consisting of: MPEG; MPEG-2; MPEG-4; H.264; THEORA; WEBM; DIRAC; REALVIDEO; VP8; and HEVC.

7. The multi-user display system of claim 1 wherein said CAM further comprises a two-stage output latch configured to produce an ENABLE signal for said VGM corresponding to a current user graphics plane selection and an ENABLE signal for said VGM corresponding to a prior user graphic plane selection.

8. The multi-user display system of claim 1 wherein said VGE comprises a plurality of video graphics compression integrated circuits configured to simultaneously and independently encode video information contained in multiple graphics memory planes within said VGM.

9. The multi-user display system of claim 1 wherein said VGM further comprises a Region Modification Register (RMR) configured to compute a rectangle of MIN ROW/COL and MAX ROW/COL writes constituting rendered video modifications to said VGM by said VGC.

10. The multi-user display system of claim 1 wherein said RMR further comprises a ROW/COL decoder configured to calculate a modification ROW by dividing an address of said VGM by a pixels/row video aspect parameter (VAP) and a modification COL by generating the division remainder of said address of said VGM by said pixels/row video aspect parameter (VAP).

11. A multi-user display method comprising:
(1) Receiving a request from a remote mobile user device (MUD) via a computer communications network (CCN) for user process creation;
(2) Creating a user virtual machine (UVM) within a host operating system (HOS) operating context on a host computer system (HCS);
(3) Associating a process ID (PID) with an application context for said UVM;
(4) Allocating a memory plane within a video graphics memory (VGM) video memory plane (VMP) stack to support a user video context (UVC) for said UVM;
(5) Writing said PID and index of said VMP to a PID context associative memory CAM memory;
(6) Activating host application software (HAS) associated with said UVC within said UVM;
(7) Within a video device driver (VDD) operating under control of said HOS, initializing a memory plane in said VMP associated with said PID;
(8) With a video graphics encoder (VGE), encoding a VMP associated with said UVC and transmitting an encoded image to said MUD via said CCN;
(9) With said VDD, receiving a rendering command from said HAS through said HOS;
(10) With the VDD, writing said PID to said PID CAM;
(11) With said PID CAM, decoding and activating a user VMP by matching a user PID to an associated RAM element within said CAM;
(12) With said VDD, instructing a video graphics controller (VGC) to write a selected memory plane in said VGM with graphics rendering information;
(13) With a video graphics encoder (VGE) controller, compressing a selected memory plane in said VGM to produce a compressed VGP;
(14) With said VGE, transmitting said compressed VGP to said MUD via serial communication controller (SCC); and
(15) With said MUD, decoding said transmission from said VGE and rendering said decoded video data on a display on said MUD.

12. The multi-user display method of claim 11 wherein said SCC comprises an Ethernet hardware interface.

13. The multi-user display method of claim 11 wherein said CCN comprises the Internet.

14. The multi-user display method of claim 11 wherein said HOS comprises a MICROSOFT WINDOWS operating system.

15. The multi-user display method of claim 11 wherein said MUD is selected from a group consisting of: smartphone; IPHONE; cellular phone; computer tablet; IPAD; laptop; and desktop computer.

16. The multi-user display method of claim 11 wherein said VGE implements a video compression format selected from a group consisting of: MPEG; MPEG-2; MPEG-4; H.264; THEORA; WEBM; DIRAC; REALVIDEO; VP8; and HEVC.

17. The multi-user display method of claim 11 wherein said CAM further comprises a two-stage output latch configured to produce an ENABLE signal for said VGM corresponding to a current user graphics plane selection and an ENABLE signal for said VGM corresponding to a prior user graphic plane selection.

18. The multi-user display method of claim 11 wherein said VGE comprises a plurality of video graphics compression integrated circuits configured to simultaneously and independently encode video information contained in multiple graphics memory planes within said VGM.

19. The multi-user display method of claim 11 wherein said VGM further comprises a Region Modification Register (RMR) configured to compute a rectangle of MIN ROW/COL and MAX ROW/COL writes constituting rendered video modifications to said VGM by said VGC.

20. The multi-user display method of claim 11 wherein said RMR further comprises a ROW/COL decoder configured to calculate a modification ROW by dividing an address of said VGM by a pixels/row video aspect parameter (VAP) and a modification COL by generating the division remainder of said address of said VGM by said pixels/row video aspect parameter (VAP).

21. A computer usable storage device having computer-readable program code means comprising a multi-user display method comprising:
(1) Receiving a request from a remote mobile user device (MUD) via a computer communications network (CCN) for user process creation;
(2) Creating a user virtual machine (UVM) within a host operating system (HOS) operating context on a host computer system (HCS);
(3) Associating a process ID (PID) with an application context for said UVM;
(4) Allocating a memory plane within a video graphics memory (VGM) video memory plane (VMP) stack to support a user video context (UVC) for said UVM;
(5) Writing said PID and index of said VMP to a PID context associative memory CAM memory;
(6) Activating host application software (HAS) associated with said UVC within said UVM;
(7) Within a video device driver (VDD) operating under control of said HOS, initializing a memory plane in said VMP associated with said PID;
(8) With a video graphics encoder (VGE), encoding a VMP associated with said UVC and transmitting an encoded image to said MUD via said CCN;
(9) With said VDD, receiving a rendering command from said HAS through said HOS;
(10) With the VDD, writing said PID to said PID CAM;
(11) With said PID CAM, decoding and activating a user VMP by matching a user PID to an associated RAM element within said CAM;

(12) With said VDD, instructing a video graphics controller (VGC) to write a selected memory plane in said VGM with graphics rendering information;

(13) With a video graphics encoder (VGE) controller, compressing a selected memory plane in said VGM to produce a compressed VGP;

(14) With said VGE, transmitting said compressed VGP to said MUD via serial communication controller (SCC); and

(15) With said MUD, decoding said transmission from said VGE and rendering said decoded video data on a display on said MUD.

22. The computer usable medium of claim 21 wherein said SCC comprises an Ethernet hardware interface.

23. The computer usable medium of claim 21 wherein said CCN comprises the Internet.

24. The computer usable medium of claim 21 wherein said HOS comprises a MICROSOFT WINDOWS operating system.

25. The computer usable medium of claim 21 wherein said MUD is selected from a group consisting of: smartphone; IPHONE; cellular phone; computer tablet; IPAD; laptop; and desktop computer.

26. The computer usable medium of claim 21 wherein said VGE implements a video compression format selected from a group consisting of: MPEG; MPEG-2; MPEG-4; H.264; THEORA; WEBM; DIRAC; REALVIDEO; VP8; and HEVC.

27. The computer usable medium of claim 21 wherein said CAM further comprises a two-stage output latch configured to produce an ENABLE signal for said VGM corresponding to a current user graphics plane selection and an ENABLE signal for said VGM corresponding to a prior user graphic plane selection.

28. The computer usable medium of claim 21 wherein said VGE comprises a plurality of video graphics compression integrated circuits configured to simultaneously and independently encode video information contained in multiple graphics memory planes within said VGM.

29. The computer usable medium of claim 21 wherein said VGM further comprises a Region Modification Register (RMR) configured to compute a rectangle of MIN ROW/COL and MAX ROW/COL writes constituting rendered video modifications to said VGM by said VGC.

30. The computer usable medium of claim 21 wherein said RMR further comprises a ROW/COL decoder configured to calculate a modification ROW by dividing an address of said VGM by a pixels/row video aspect parameter (VAP) and a modification COL by generating the division remainder of said address of said VGM by said pixels/row video aspect parameter (VAP).

* * * * *